(12) United States Patent
Bigi

(10) Patent No.: US 12,377,721 B2
(45) Date of Patent: Aug. 5, 2025

(54) COMPACT POWERTRAIN FOR TRANSPORT VEHICLES

(71) Applicant: AUTOMAC ENGINEERING S.R.L., Novi di Modena (IT)

(72) Inventor: Maurizio Bigi, Novi di Modena (IT)

( * ) Notice: Subject to any disclaimer, the term of this patent is extended or adjusted under 35 U.S.C. 154(b) by 413 days.

(21) Appl. No.: 18/001,722

(22) PCT Filed: Jun. 15, 2021

(86) PCT No.: PCT/IT2021/050183
§ 371 (c)(1),
(2) Date: Dec. 14, 2022

(87) PCT Pub. No.: WO2021/255766
PCT Pub. Date: Dec. 23, 2021

(65) Prior Publication Data
US 2023/0234433 A1 Jul. 27, 2023

(30) Foreign Application Priority Data
Jun. 15, 2020 (IT) .................. 102020000014236

(51) Int. Cl.
*B60K 17/08* (2006.01)
*B60K 5/08* (2006.01)
*B60K 6/48* (2007.10)

(52) U.S. Cl.
CPC .................. *B60K 5/08* (2013.01); *B60K 6/48* (2013.01); *B60K 17/08* (2013.01)

(58) Field of Classification Search
CPC .. F02D 25/00; B60K 5/08; B60K 6/36; B60K 6/38; B60K 17/08; B60K 17/22
See application file for complete search history.

(56) References Cited

U.S. PATENT DOCUMENTS 4,392,393 A * 7/1983 Montgomery ........... B60K 5/08
  74/661
6,533,701 B2 * 3/2003 Maruyama ............ B60W 30/19
  477/3

(Continued)

*Primary Examiner* — Jeffrey J Restifo
(74) *Attorney, Agent, or Firm* — Patshegen IP; Moshe Pinchas

(57) ABSTRACT

A compact powertrain, comprises a first engine and a second engine and means for rotationally connecting said engines to a common output shaft; the engines have drive shafts with axles parallel to each other; connection means between said drive shafts and an output shaft, moreover, they comprise first coupling means on said first drive shaft for connecting said first drive shaft to the output shaft, and second coupling means for connecting said second drive shaft to said output shaft; the delivery of the rotational torque and power is controlled by the adjustment of each engine and said coupling means, being adapted to selectively connect/disconnect said drive shafts from said output shaft; the means for connecting the rotation of the two engines, left and right, to the output shaft comprise a clutch assembly and a gearbox; the clutch assembly is provided with a single clutch for drive shaft which connects or disconnects the respective drive shaft with a corresponding input and transmission shaft inside the gearbox; the common output shaft, of the rotation from the compact powertrain, rotates receiving motion by means of pairs of gears present respectively on one said transmission shaft, inside the gearbox, and on the output shaft, with the selective insertion or disengagement of the clutches and, depending on the rotational speed, of coupling engagements on the transmission shafts and of said gears present on said shafts; and it has one or more idle gears on the output shaft controlled by the rotation with at least one coupling engagement to the output shaft to receive the rotation, with the engagement inserted, or, when disengaged, transmit the rotation from one transmission shaft towards the other transmission shaft without any action on the output shaft.

(Continued)

Entirely endothermic, hybrid or electrical embodiments are described for both land vehicles of all kinds and boats.

20 Claims, 14 Drawing Sheets

(56) References Cited

U.S. PATENT DOCUMENTS

| | | | | |
|---|---|---|---|---|
| 8,235,154 | B2* | 8/2012 | Hermann, Jr. | B60K 6/46 |
| | | | | 180/65.245 |
| 8,323,144 | B1* | 12/2012 | Bin | B60K 6/48 |
| | | | | 477/3 |
| 8,330,291 | B2* | 12/2012 | Kumar | B60L 1/02 |
| | | | | 307/9.1 |
| 8,438,948 | B2* | 5/2013 | Friedmann | F02D 25/04 |
| | | | | 74/661 |
| 9,889,733 | B2* | 2/2018 | Yang | B60K 6/38 |
| 9,897,164 | B2* | 2/2018 | Eo | F16H 3/006 |
| 9,897,165 | B2* | 2/2018 | Mordukhovich | F16H 3/097 |
| 11,162,562 | B2* | 11/2021 | Yu | B60K 5/08 |
| 11,338,789 | B2* | 5/2022 | Gruner | B60K 5/08 |
| 2023/0234433 | A1* | 7/2023 | Bigi | B60K 5/08 |
| | | | | 180/69.6 |

* cited by examiner

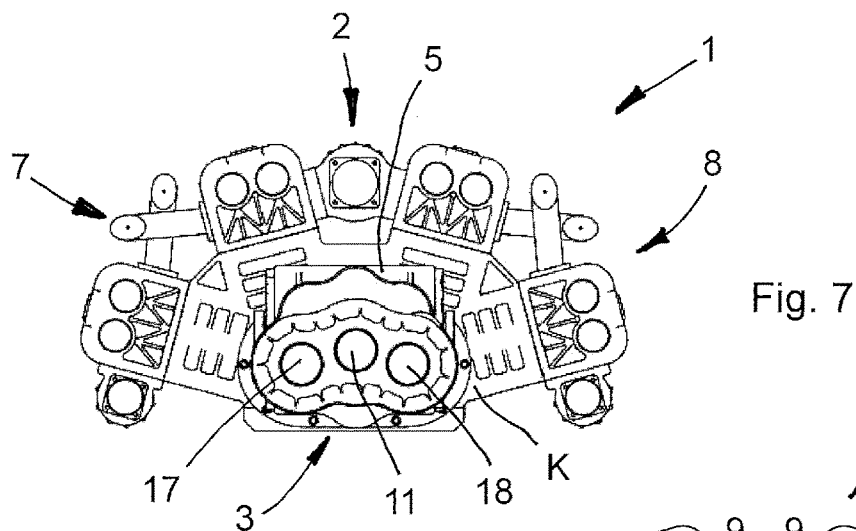
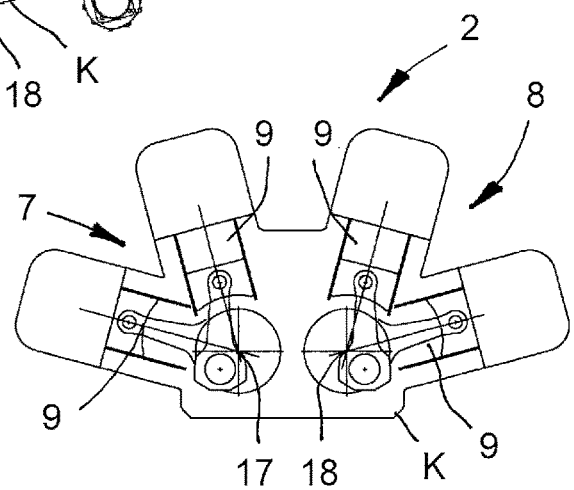
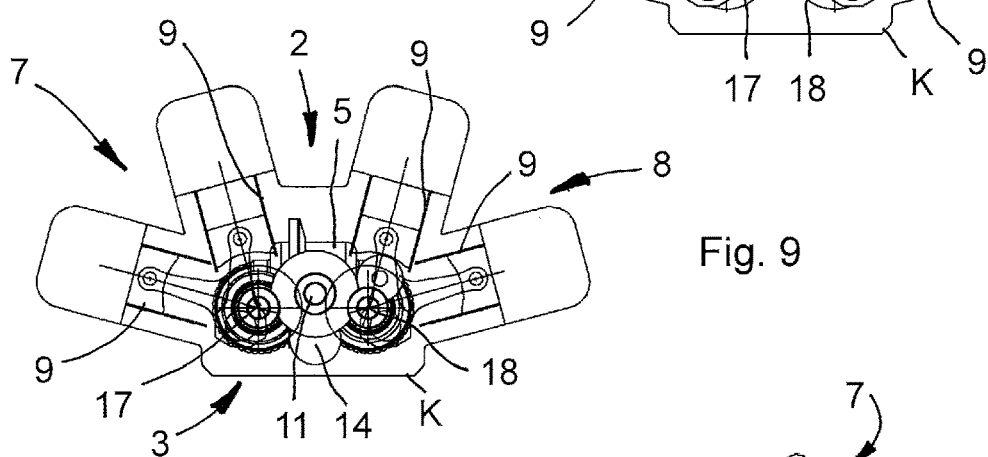
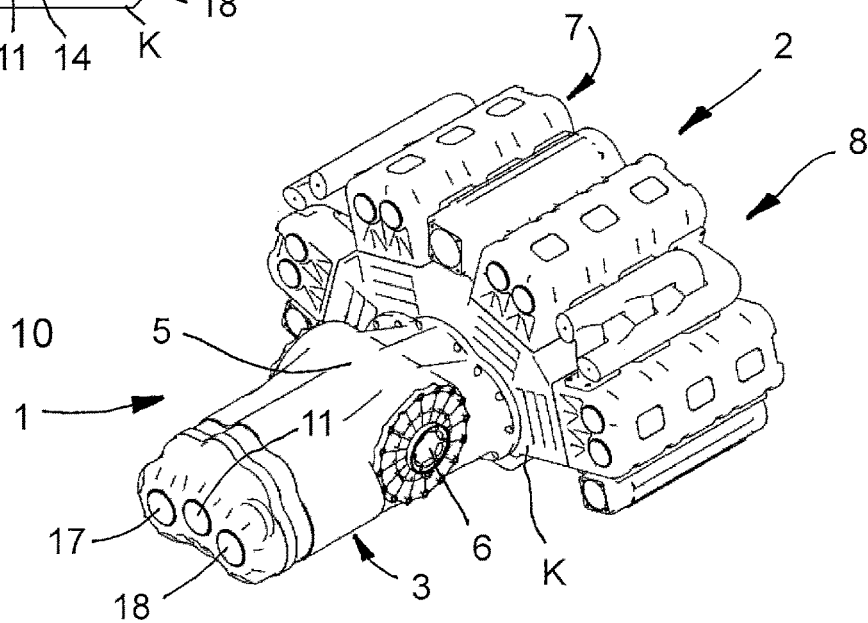

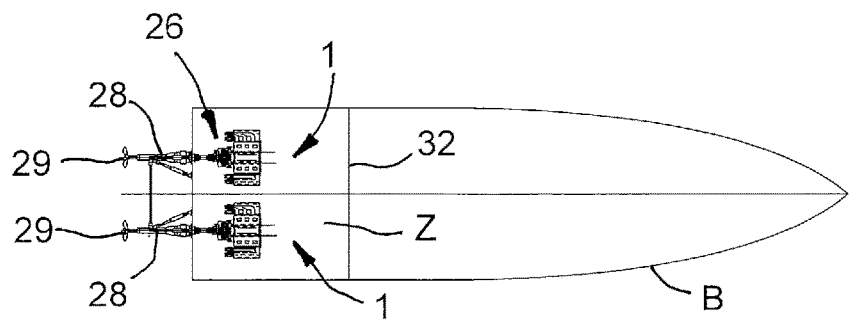
Fig. 38
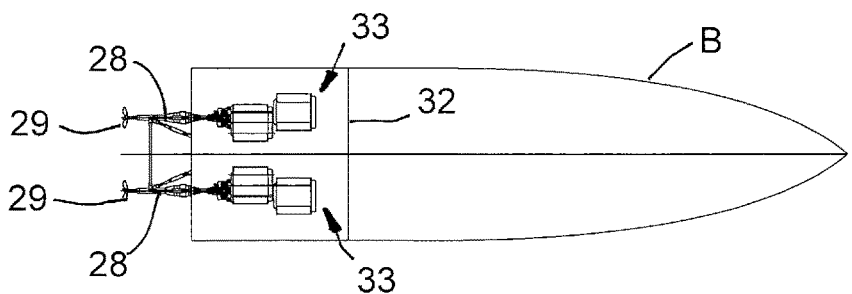
Fig. 39
Fig. 36
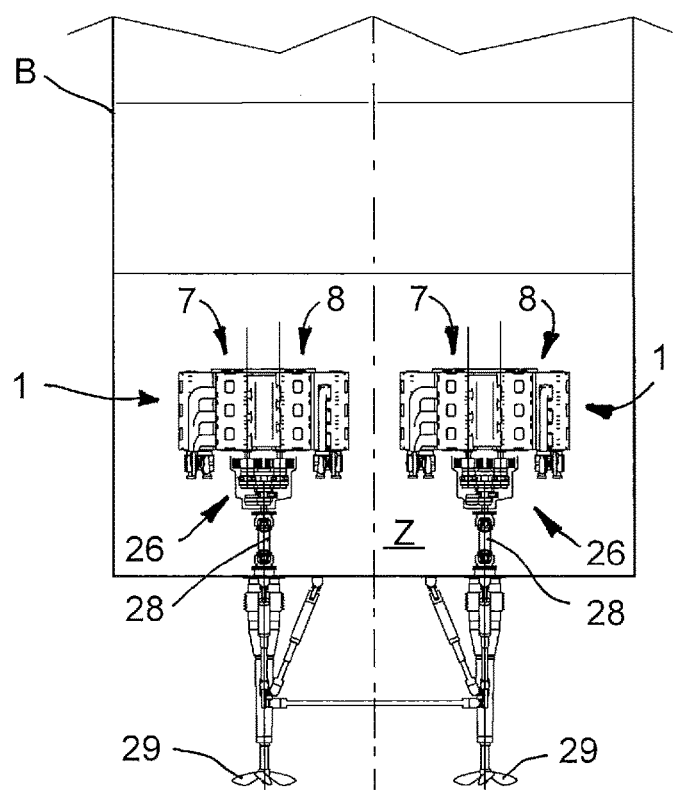
Fig. 37
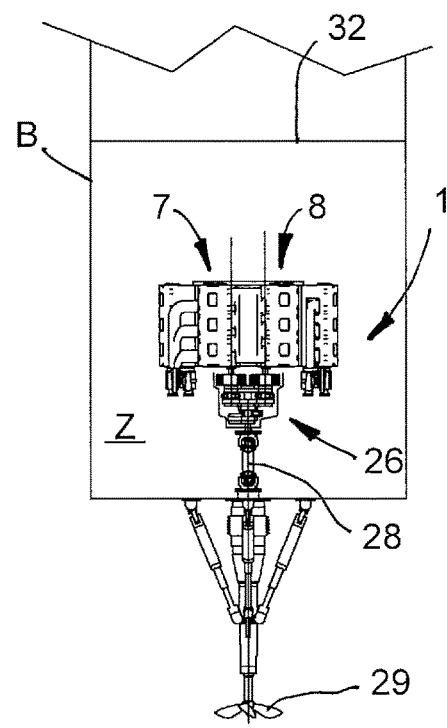

COMPACT POWERTRAIN FOR TRANSPORT VEHICLES

FIELD OF APPLICATION

The present invention relates to a compact powertrain, i.e., a set including endothermic engine, gearbox and relative transmission for use in propulsion on a boat or for the wheels of a motor vehicle, so as to obtain a significant reduction in the sizing of the parts while maintaining a transmitted power equal to or greater than the known powertrains, even with high power. The method of construction and installation on the vehicle is also described, whether it is a sports car or multi-purpose vehicle such as modern sports utility vehicles or even a boat which must have high power in propulsion while maintaining limited dimensions, consumption and masses.

BACKGROUND ART

The state of the art comprises various constructive solutions of endothermic engines in which the cylinders included in the construction of the engine are divided into two cylinder banks lying on a single crankshaft. A specific and already known solution is to divide the cylinder banks on two parallel, side-by-side drive shafts and join them in a mechanical transmission before the clutch and the gearbox for the output shaft.

From document US 2004/0138023 A1 it is known to construct two drive shafts in a single crankcase and combine the output shafts with a mechanical connection with one or two chains which connect and synchronously rotate the two drive shafts. In the next part of the transmission a conventional clutch and gearbox are used to move a vehicle with four wheels, such as a car.

This document, even if it proposes a construction of the two drive shafts and related cylinders in two cylinder banks on a single engine crankcase, in the transmission of the motion sums the two torques and powers generated by each engine in a single output shaft with the need to construct the clutch and the conventional gearbox for the total power and torque generated by the aforementioned combination of the two endothermic engines. That is, if this powertrain construction is applied to medium-power engines, i.e., to vehicles for daily use on the road, it produces a satisfactory solution, while if applied to endothermic engines where each engine also produces 700 kW, for the sizes which are to be given to the clutch and to the transmission with a sufficient number of ratios, the construction is bulky and of excessive mass, since the clutch and the transmission must be sized for the total power of 1400 kW.

In fact, modern gearboxes which also require from 7 to 10 different speed ratios and double clutches, generally coaxial, for the best management of the insertions and gear shifts, lead to constructing large and expensive clutches to support the power and double torque of a single engine, thus also the gears present in the gearbox are sized similarly as all the power, the sum of the instantaneous power being generated by the pair of engines, which must be transmitted by the single pair of gears engaged at that moment of the specific transmission ratio necessary for the drive desired and selected by the driver.

Furthermore, US 2012/190492 A1 makes known the arrangement of transmission engines with two transmission assemblies which are operable independently from each other and include transmission shafts arranged in the longitudinal direction of the vehicle, and with two transmission assemblies, one respectively of the transmission assemblies forming a partial transmission train with a transmission engine and a respective clutch device arranged between the transmission engines and the transmission assemblies within the partial transmission trains. The engagement devices, with clutch, of the two partial transmission trains are arranged so as to be offset from each other in the longitudinal direction of the vehicle so as to be arranged overlapping in the transverse direction of the vehicle.

In the prior art there are various documents which propose combining two first engines, both endothermic or one endothermic and the other an electric engine/generator, to a transmission to control and manage the engine power in a modular manner with the aim of reducing the costs of production, management, fuel consumption and consequently also the resulting environmental pollution. Moreover, the proposed combinations are insufficient in the actual reduction of construction costs without minimizing the installed power and actual performance of the vehicle involved in the use of the resulting compact powertrain.

In fact, from CN 106080161 A it is known to combine two internal combustion engines with a coupler and individual engagements on each engine and a cascade of clutches: one inside the coupler and an external clutch which supports all the output torque directed to the gearbox of the vehicle concerned. That is, the transmission in the gearbox is sized for the total power which can be developed by the coupled endothermic engines.

Furthermore, from WO/2010/149128 A1 it is known to combine two in-line axially aligned internal combustion engines, with a gearbox and coupler, with individual clutches on each engine, so the torque is divided per single engine within the gearbox, while the output torque directed to the wheels of the vehicle concerned can independently come from only one of the engines or both. That is, the transmission in the gearbox is sized for the single power which can be developed by the endothermic engine concerned, but the versatility of using one or the other coupled engine is limited to the ratios in the gearbox part affected by the single engine, limiting the versatility to the transmission ratios provided in the individual pairs of geared gearwheels.

Moreover, from the prior DE 10 2015 010 331 A1 mechanical transmission schemes with clutches, couplers and gearboxes with two inputs and one output of the rotary motion are known, to manage the torque to the wheels of a generic vehicle. In this document, two internal combustion engines or even one endothermic engine and an electrical one are coupled in the transmission schemes described. Moreover, even in the schemes where each of the two engines rotates a single input shaft in the gearbox, obviously different and separate from the other input shaft, each transmission ratio remains confined to the gearwheels geared by the input shaft towards the output shaft of the rotational motion from the gearbox.

With the setting of the combination in the previous documents of the two endothermic engines or combined with an electric engine, moreover included in the last document as engines for vehicles or with longitudinal/transverse arrangement, the management mode of the transmission of torque and power with a greater modulation remains unsolved, i.e., quite varied and typical of the means indicated, such as sports cars, multi-purpose vehicles or sport utility vehicles or even boats which must have high propulsion power, but also require a modulation of torque and power which is not always maximum, but a function of the terrestrial or nautical movement speeds required by the vehicle; lastly, also the creation of transmissions for operating machines which need high power and a high but controlled modulation of the transmission. This is because the limited space in vehicles or boats does not allow the arrangement of engines of adequate power of those indicated above and with a high versatility in the management of the transmitted torque through the use of suitable ratios for rotational speed and transmitted torque.

Moreover, it is a well-known technical problem, repeatedly addressed by manufacturers and solved in different manners, to create a drivetrain for the vehicle to be motorized and that, for the construction philosophy, if it must have unprecedented performance in torque, power, speed, recovery, it is imperative to reduce the mass of the vehicle or vessel concerned to the minimum possible value. As is known, this limit of mass particularly affects the sizing of the propulsion-transmission unit adopted for said vehicle, as it is a significant value in the total mass of the vehicle, involving and limiting as much as possible the overall dimensions and the masses of the drivetrain or propulsion-transmission unit.

Furthermore, the complete versatility of the transmission serving the motorization remains unsolved when it is oriented to energy savings both with the use of small engines and with the use of hybrid motorization solutions in which the electric engine as well as the drivetrain can operate as a generator in the slowing and/or braking phases of the vehicle on which the powertrain is mounted.

Finally, the association of the known solutions with the said technical limit linked to the size and mass of the endothermic engine powertrain, as well as the related transmission, leaves unsolved the issue of how to combine the parts of the endothermic/electric engine unit and transmission to respond to the multiple aforementioned limitation requirements when a vehicle is to be created, whether a boat or a land vehicle, which exceeds the now-known limits in the concentration of power and torque, but still maintains a modulation of use of the torque and power generated which can meet all the needs which said usual or high-performance vehicles require; finally, not least also involving a transmission of motion with hybrid generation of rotation i.e., by endothermic engine and electric engine/generator.

This state of the art is subject to considerable improvements with regard to the possibility of constructing a compact powertrain, which overcomes the aforementioned drawbacks and limitations found in the prior art and which constructs a less expensive and more functional powertrain for a vessel or land vehicle which allows to achieve very high performance, obtaining savings on the costs of construction and use than what is currently known, even if the vehicle created can demonstrate performance in torque, power, speed and recovery not previously achieved by a similar vehicle, whether a vessel or land vehicle.

Therefore, the technical problem underlying the present invention is that of constructing a compact powertrain which, in addition to obtaining the combination of solutions variously applied in the art, also achieves greater integration and participation of the parts in the construction and use advantages, as well as in the use and maintenance of the powertrain obtained.

An inherent object in the previous technical problem is that of constructing a powertrain with an endothermic engine which, while maintaining a very small size, can develop very high powers and torques; furthermore, the transmission of power and torque obtained by the endothermic engine assembly is of limited footprint and capable of transmitting all the power and torque generated by the movement of the vehicle on which it is installed.

A corollary to the technical problem presented concerns the possibility of making the power and torque delivered versatile and modulable as a function of the motion requests of the vehicle on which the powertrain with endothermic engine and transmission is mounted with different power of the two endothermic engines coupled by the transmission in the compact powertrain.

A further aspect of the technical problem concerns the versatility which the compact powertrain can simultaneously use, both an endothermic engine and an electric engine/generator while maintaining the versatility of use of each type of engine used in the operating phases of the transport vehicle.

Finally, a further part of the above-mentioned technical problem concerns the construction of a sports car with extreme performance, but which is of minimal dimensions, reduced mass and with a very large passenger compartment and not previously obtained in vehicles with extreme performance known in the art.

SUMMARY OF THE INVENTION

This technical problem is solved, according to the present invention, by a compact powertrain, comprising a first engine and a second engine and means for rotationally connecting said engines to a common output shaft; the engines have drive shafts with axles parallel to each other; connection means between said drive shafts and an output shaft, moreover, they comprise first coupling means on said first drive shaft for connecting said first drive shaft to the output shaft, and second coupling means for connecting said second drive shaft to said output shaft; the delivery of the rotational torque and power is controlled by the adjustment of each engine and said coupling means, being adapted to selectively connect/disconnect said drive shafts from said output shaft; the means for connecting the rotation of the two engines, left and right, to the output shaft comprise a clutch assembly and a gearbox; the clutch assembly is provided with a single clutch for the drive shaft which rotatably connects or disconnects the respective drive shaft with a corresponding input and transmission shaft inside the gearbox; the common output shaft, of the rotation from the compact powertrain, rotates receiving motion by means of pairs of gears present respectively on one said transmission shaft, inside the gearbox, and on the output shaft, with the selective insertion or disengagement of the clutches and, depending on the rotational speed, of coupling engagements on the internal transmission shafts and said gears present on the shafts; characterized in that it has one or more idle gears on the output shaft controlled by rotation with at least one coupling engagement to the output shaft to receive the rotation, with the engagement inserted, or, when disengaged, transmit rotation from one internal transmission shaft towards the other internal transmission shaft without any action on the output shaft.

Furthermore, a specific embodiment of the compact powertrain has the first engine or the second multi-cylinder engine and a rotation reversal shaft between one of the transmission shafts, for rotation reversal, and the common output shaft or on the rotation output shaft, for the specific conformation obtained of the compact powertrain for land vehicles or boats.

Moreover, in a further improved embodiment both engines are multi-cylinder and made on a single engine crankcase with the division of the cylinders into two rows of cylinders and with a "V"-shaped arrangement.

In a specific and preferred embodiment, the arrangement of the drive shafts of the two engines, first and second, identifies a plane, together with the clutches of the clutch assembly and the transmission shafts inside the gearbox, i.e., of the axles of the left and right assemblies, not containing the axle of the output shaft, which remains parallel thereto but not coplanar.

In an embodiment, said left and right transmission shafts inside the gearbox have a respective wheelbase with the output shaft of the rotary motion from the gearbox of a different value.

Furthermore, in a preferred embodiment of the compact powertrain, in the gearbox at least one pair of gears between each of the two left and right internal transmission shafts and the output shaft both engage on a single gear placed on the output shaft, regardless of whether they have the same or different transmission ratio thereof.

Moreover, in an advantageous embodiment of a motor vehicle, the compact powertrain has the transmission ratios between the keyed gears, on a respective internal transmission shaft, have a different value and are scaled in alternating succession with each other if geared by the left internal transmission shaft or by the right internal transmission shaft, towards the output shaft of the rotary motion from the gearbox.

In an embodiment variant of the motor vehicle, pairs of gears are present and engage between the transmission shafts inside the gearbox and the output shaft and in which the pair of gears of the highest gear, of each transmission shaft, has a rotation ratio of equal value from each internal transmission shaft to the output shaft to achieve the transmission ratio with the highest gear.

Furthermore, in a further embodiment of the motor vehicle the transmission of the rotary motion to the wheels also occurs by means of the transmission to the other drive wheels of a four-wheel drive vehicle, with a transmission shaft to the second axle engaging with the output shaft from the gearbox.

Finally, in an advantageous embodiment of a high-performance boat at least one compact powertrain is installed in which the reverse rotation shaft engages between the output shaft from the gearbox and a shaft connecting to the axis line with the propeller of the compact powertrain.

Further features and advantages of the present invention, in the embodiment of a compact powertrain, will result from the following description of exemplary embodiments of the compact powertrain, as illustrated above by way of non-limiting example with reference to the fourteen attached drawing pages.

BRIEF DESCRIPTION OF THE DRAWINGS

FIG. 7 depicts a schematic view of the compact powertrain in a direction parallel to the axles of the transmission shafts viewed from the transmission side;

FIG. 8 depicts a schematic section on a pair of V-cylinders of the two engines made in the single engine crankcase and on two separate, parallel and aligned, independently rotating drive shafts connected with a respective clutch to the input shaft in the gearbox;

FIG. 9 depicts a schematic section similar to FIG. 8 but with two pairs of gears of the gearbox depicted to show the compactness of the transmission made in association with the compact powertrain with two engines in the same engine crankcase and the gearbox immediately downstream of the clutches of each drive shaft;

FIG. 10 depicts a schematic perspective view of a compact powertrain according to the invention provided with an eleven-ratio gearbox for the transmission to a motor vehicle axle;

FIG. 11 depicts one of the ratios with the sum of the torque generated by each engine; FIG. 12 shows the transmission of torque from the right transmission shaft through a pair of gears present between the left transmission shaft and the output shaft, obviously with the left clutch open; FIG. 13 shows the diagram of the transmission of the rotary motion entering from the left shaft with the rotation reversing directions with the passage on the reverse gear, rotating the right transmission shaft in the opposite direction to the left shaft; the rotation is transmitted to the output shaft towards the differential through the pair of gears between the right transmission shaft and the output shaft towards the differential;

FIG. 36 depicts a schematic plan view of the engine shaft of a boat with high power motorization and made with two powertrains with endothermic engines with rotating shafts housed in the same engine crankcase, similar to the engine assembly of FIG. 10, here provided with the transmission for the engine assembly of FIG. 34, which obtains a considerable saving of overall dimensions on board the boat;

FIG. 37 depicts a schematic plan view of the engine shaft of a boat with high power motorization and with a single powertrain with endothermic engines with rotating shafts housed in the same engine crankcase, similar to the engine assemblies of FIG. 36;

FIGS. 38 and 39 depict a schematic comparison in the same boat of the motorization of the type known in the art, FIG. 39 with two high-performance engines placed in tandem on a coupler on the propeller shaft; while FIG. 38 schematically depicts the overall dimensions of the compact powertrains, also comprising the transmission and the rotation inverter of FIG. 34, with power similar to the power developed by the high-performance tandem engines of FIG. 39.

DETAILED DESCRIPTION OF SOME PREFERRED ILLUSTRATED EMBODIMENTS

Figure 2:
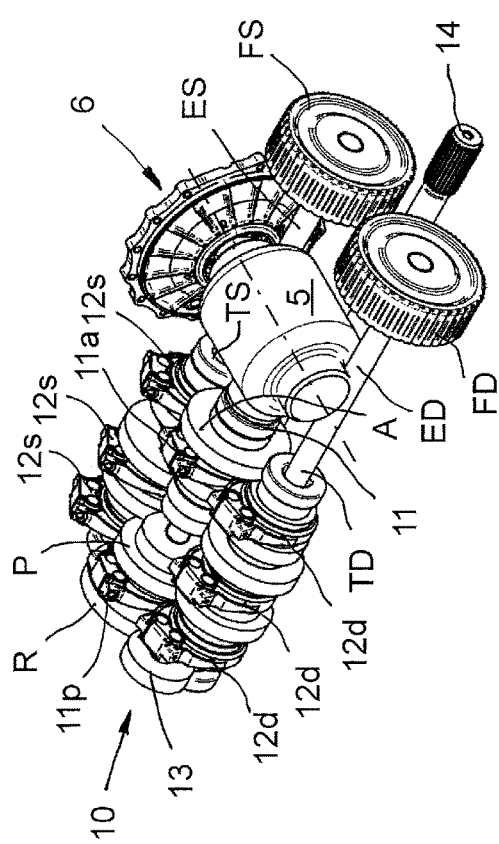
FIG. 2 depicts a schematic perspective view of the transmission and the input and output shafts therefrom of the constructive solution of FIG. 1 without the endothermic engine on the two independent shafts; in this case the differential is shown partially in order to highlight the two input shafts in the transmission each independent of the respective engine and the third output shaft of the rotary motion from the transmission; if the third shaft is also provided for motorization to a further traction axle of the motor vehicle.
Figure 1:
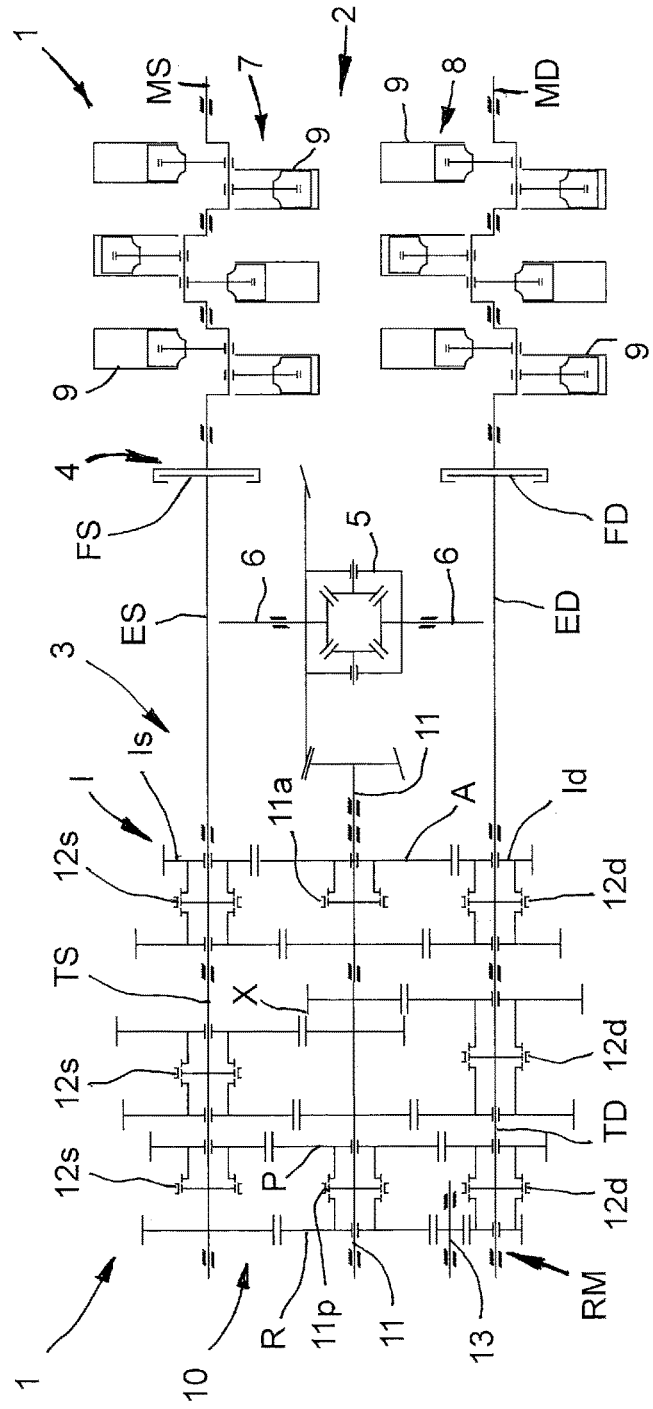
FIG. 1 depicts a diagram of the members of the compact powertrain according to the invention in the case of application to a motor vehicle; it depicts the functional rotation connections between the endothermic engine with two separate shafts rotating independently, the clutch of each drive shaft for connection with a respective input shaft in the transmission, the gearbox with parallel shafts downstream of the clutch, a third output shaft of the torque and transmitted power and also depicts a differential, usually in conical pairs, for the connection of the third shaft to a traction axle of the motor vehicle; in it three idle gears and rotation connection joints with the output shaft are visible.
Figure 4:
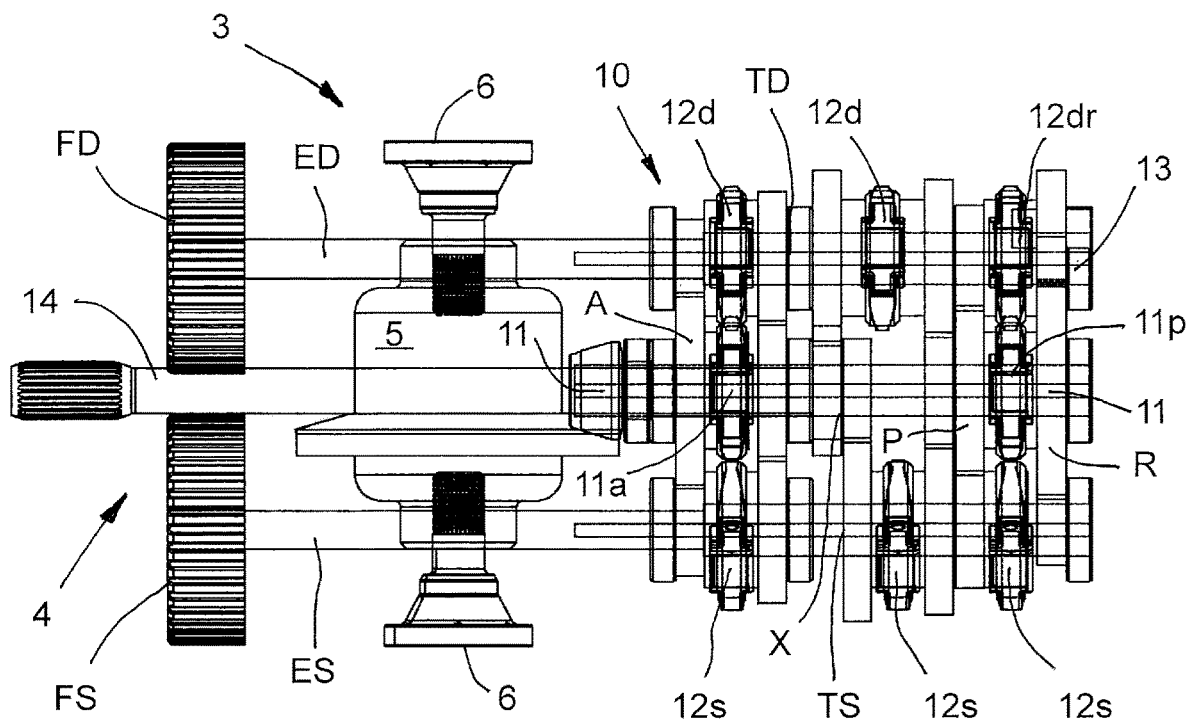
FIG. 4 depicts a schematic plan view of the transmission of the rotary motion from the clutches to the pairs of gears of the gearbox and to the differential for the traction axle of a motor vehicle, i.e., the transmission plan of FIG. 2.
Figure 3:
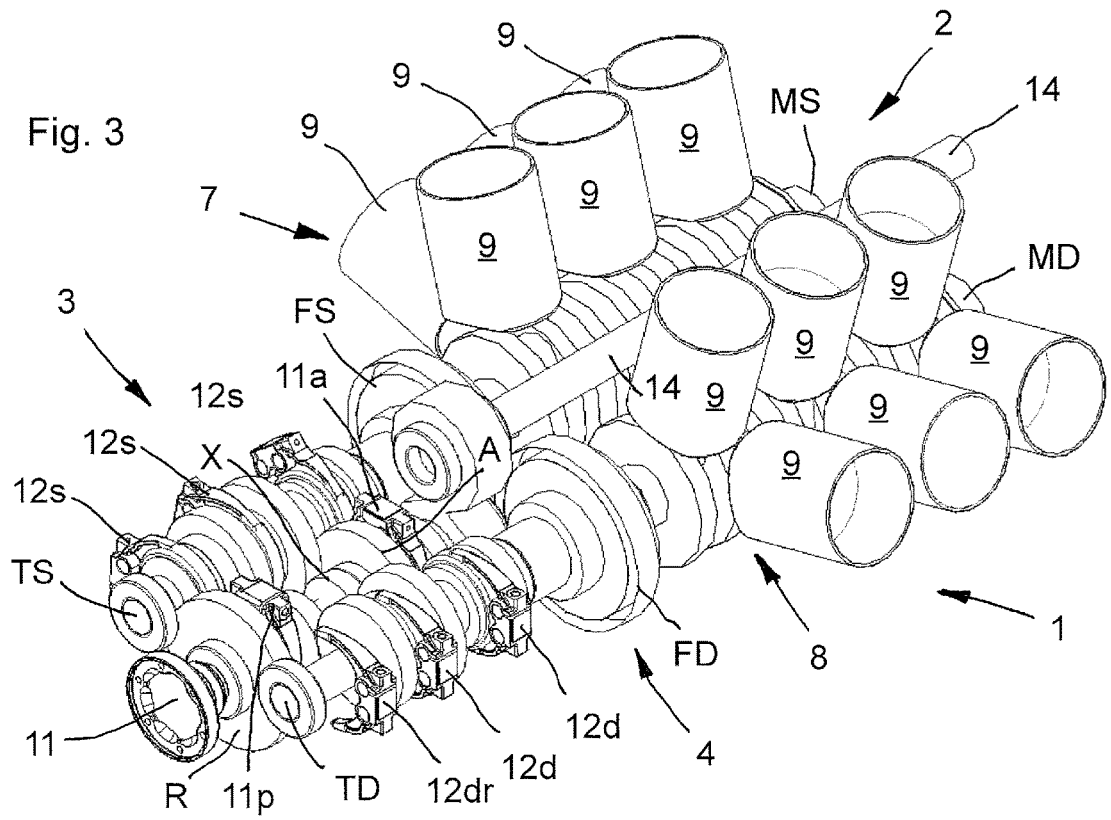
FIG. 3 depicts a schematic perspective and simplified view for the engines of the components of the compact endothermic engine assembly also with the transmission and the gearbox; the diagram shows the possible two-axle transmission of both engines in the front and rear position of the compact powertrain; in this Figure there is no differential and the reverse countershaft is not shown, therefore this embodiment can be used as a compact powertrain in a vehicle with one or two differentials outside the compact powertrain.

FIG. 1 shows a compact powertrain 1 intended as a whole, in a first embodiment, in which there is an engine assembly 2 and a transmission assembly 3 connected with a clutch assembly 4; with 5 a differential for connecting the transmission to a drive axle 6 of a motor vehicle on which the compact powertrain 1 is mounted. The engine assembly 2 is formed by two engines 7 and 8 with MS, the left drive shaft, and MD, the right drive shaft, which advantageously have the three-cylinder bank V architecture 9 each; each engine has an input shaft to the clutch assembly 4, ES, the left, and ED, the right, which end in the respective clutch, with FS, the left, and FD, the right; the connection of the clutches occurs with a respective left shaft TS or right TD at the input of the transmission inside the gearbox 10; the gearbox comprises pairs of wheels to define at least five gear ratios between each input shaft TS or TD between said shafts and an output shaft 11 of the transmission by means of front engagements both on the input shafts 12$d$ from the right and 12$s$ from the left, and on the output shaft 11$a$ and 11$p$, which connect to said shaft 11 the idle A, front, P, rear and R reverse gears individually from the left transmission shaft. Between the right input shaft TD and the output shaft 11 there is an intermediate countershaft gear 13 for the reverse connection RM. Furthermore, it is possible to detect the presence of the first gear ratio I which is different if the motion comes from the left shaft TS with the first gear left connection gear Is or from the shaft TD with the first gear right connection gear Id. Finally, the connection of the gears of the longest gear X is visible, in which both the input shafts TS and TD transmit the motion to the output shaft 11 of the transmission with the same ratio, therefore, the two engines 7 and 8 can both rotate at the same number of revolutions only with the transmission set thereon.

Figure 6:
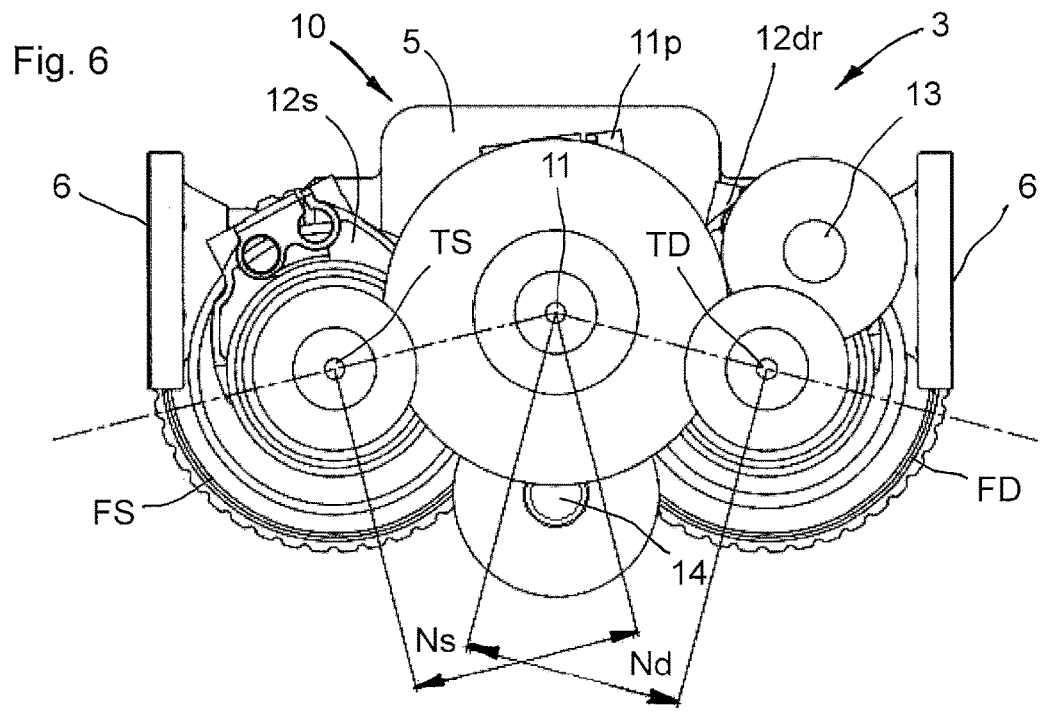
FIG. 6 depicts an axial schematic view of the left and right input shafts and the third output shaft so as to note the spatial arrangement and the difference between the wheelbase of the pairs of gears engaging between the left transmission shaft and the transmission output shaft, as well as between the right transmission shaft and the transmission output shaft.

FIGS. 2-4, 6 also show a transmission shaft 14 of the motion to a second drive axle of the motor vehicle to achieve all-wheel drive on the four wheels of an all-wheel drive vehicle. Thus, in FIGS. 4 and 6 the arrangement between the left TS and right TD input shafts of the transmission with respect to the output shaft 11 obtained with the wheelbase difference Ns, wheelbase between left shaft and output shaft 11, and Nd, wheelbase between right shaft and output shaft 11, which allows to obtain different transmission ratios, is imperceptibly visible in FIG. 4 but can be noted much better in FIG. 6. Moreover, the difference in wheelbases favours the non-coplanar construction between the three gearbox shafts; in fact, the left and right transmission shafts TS and TD are placed at a different level of the output shaft 11 and consequently from the transmission shaft to the second axle 14, as seen in FIG. 6. The transmission ratios are obtained with scalar value interspersed between the gears which transmit motion between the left shaft TS and the output shaft 11 with respect to the gears which transmit motion between the right shaft TD and the output shaft 11.

FIGS. 7, 8, 9 and 10 depict the compact powertrain in which the distribution of the cylinders of the left 7 and right 8 engine and the two left 17 and right 18 axles can be seen, which determine the geometry of both the engine assembly 2, with the two left MS and right MD drive shafts, and of the transmission assembly 3 with the two left TS and right TD transmission shafts, as well as the compact construction of the gearbox with the output shaft 11, interposed between and at a different planar level with respect to the two TS, left, and TD, right, transmission shafts.

Figure 11:
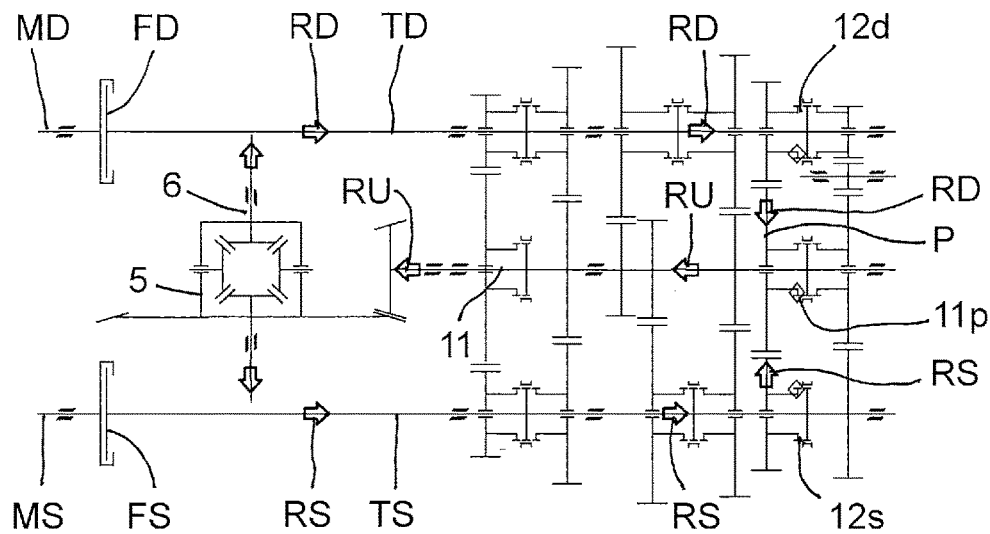
FIGS. 11, 12 and 13 depict views of the diagram of the transmission of the rotary motion entering from the two engines, i.e., through the closure/opening of the respective clutches.
Figure 12:
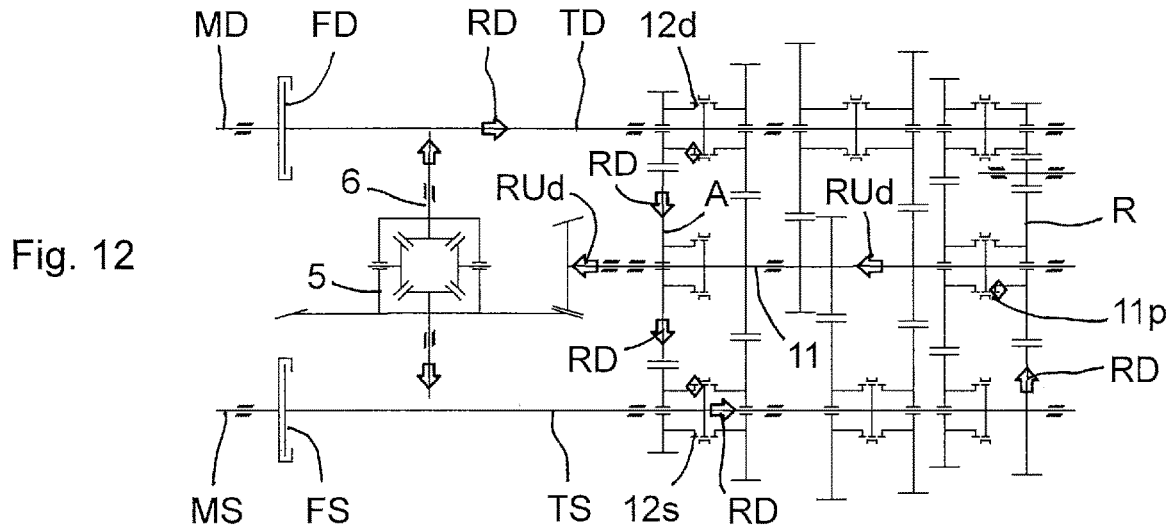
Figure 13:
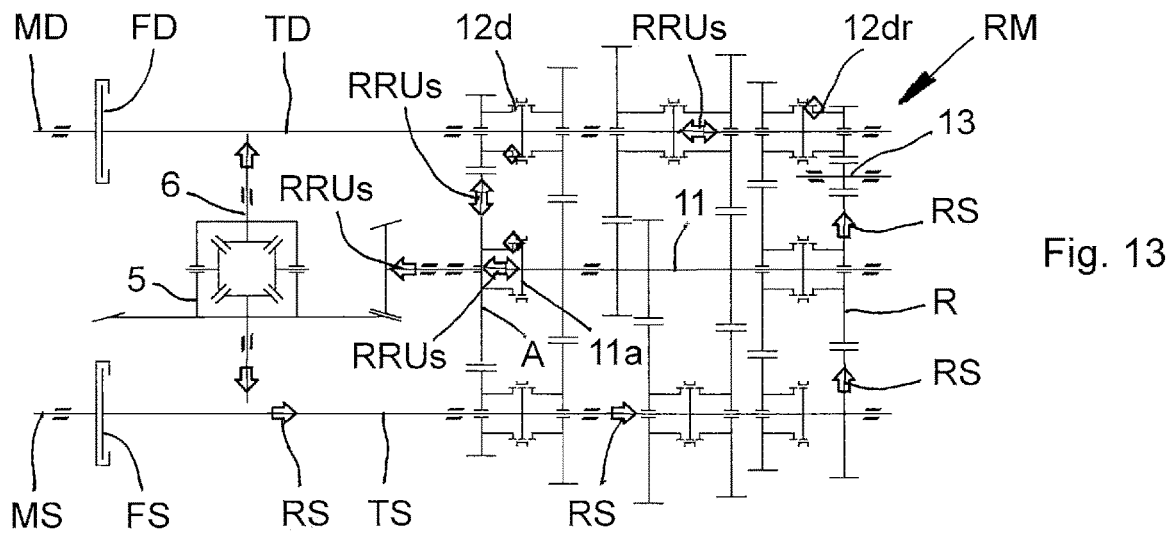

In order to understand the operation of the gear pairs indicated above, FIGS. 11-13 highlight the three characteristic modes of transmission of motion which are possible with this transmission assembly in the first embodiment, in addition to the normal transmission ratios of the gear pairs engaged arranged between the internal transmission shafts and the rotation output shaft. FIG. 11 describes the sum of the torques of the two engines, in which the rotation RD of the right engine MD and RS of the left engine MS entering the clutch FS is depicted and, by means of the respective internal transmission shaft TD and TS, rotates the output shaft of the transmission 11 with the insertion of a front engagement 12$s$ on the shaft TS, of the corresponding front engagement 11$p$ on the output shaft of the transmission 11, connecting the output shaft 11 to the idle gear P in rotation and also with the insertion of a front engagement 12$d$ on the shaft TD; the rotation RU of the output shaft 11 is thus transmitted to the differential 5 with the sum of the torques transmitted by each engine and, possibly, to the transmission shaft 14 on a second drive axle. Conversely, FIG. 12 shows the connection with the clutch FS open and the clutch FD closed, so that the left engine with MS can be kept free to rotate at minimum or even stopped. That is, the output rotational motion RUd comes only from the right engine 8, drive shaft MD, illustrated, the rotation RD enters the clutch FD and by means of the right transmission shaft rotates the output shaft of the transmission 11 with the insertion of the front engagement 12$d$ on the shaft TD and the corresponding front engagement 12$s$ on the left transmission shaft TS free to rotate, as mentioned having the clutch FS open; thereby the torque RD is transferred with the idle gear A, not connected to the output shaft of the transmission 11, to the left transmission shaft TS. The rotation RD is then transmitted to the output shaft 11 with the insertion on the latter of the engagement 11p to connect the reverse idle gear R, now connected to transmit the torque to the output shaft. In this operating mode the clutch FD must be closed and the clutch FS kept open, so that the left engine MS 7 can be kept free to rotate at minimum or even stopped.

Furthermore, in FIG. 13, the connection with the clutch FS closed and the clutch FD open is shown, so that the right engine with MD can be kept free to rotate at minimum or even stopped. That is, the output rotational motion RRUs, even in reverse, comes only from the left engine 7, drive shaft MS, illustrated, the rotation RS enters the clutch FS and by means of the left transmission shaft rotates the output shaft of the transmission 11 with the insertion of the front engagement 12dr on the shaft TD and the corresponding front engagement 12d, front, on the right transmission shaft TD free to rotate, as said having the clutch FD open; thereby the torque RS is transferred with the idle gear R, not connected to the output shaft of the transmission 11, to the right transmission shaft TD. The rotation RD is then transmitted to the output shaft 11 with the insertion on the latter of the engagement 11a to connect the front idle gear A, connected to transmit the torque to the output shaft. The rotation obtained is in any case reverse RRUs crossing the reverse shaft 13. In this operating mode the clutch FS must be closed and the clutch FD kept open, so the right MD engine 8 can be kept free to rotate at minimum or even stopped and the torque for reversing comes from the left engine even if the reverse countershaft 13 engages with the right shaft TD.

Each engine 7 and 8 rotates at its own rotational speed with the respective rotation RS and RD which enter the transmission 3 through the clutches FS and FD and the left TS and right TD transmission shafts. In this operating mode, the engagements 12s and 12d are inserted/disconnected on the respective transmission shafts TS and TD, as well as the engagements 11p and 11a are inserted or disconnected on the output shaft of the transmission 11, for the specific transmission ratio desired, so that the output rotation RU results, in the various combinations, in the sum of the torques and powers developed by the rotation RS of the left engine 7 and the rotation RD of the right engine 8. Obviously the torques are summed according to the specific ratio of the gears which are coupled and inserted in rotation by the aforementioned engagements. That is, the torques produced by the rotation of the engines are added, like the developed powers, but each engine rotates at its specific rotational speed which is different according to the only and actual speed of the vehicle which moves by the thrust of the compact powertrain with the specific different transmission ratios obtained through the compact gearbox described here.

As described above, and summarized by the diagram of FIG. 5, with the insertion of the intermediate speed ratios from the first to the ninth gear the two engines cannot turn at the same rotational speed, but this is not a problem since the engines are controlled by an electronic control unit, not depicted, independently of one another according to the driver's request of the motion to impart to the vehicle, whether it is a motor vehicle or even a boat. Therefore, only in the longest gear X will the two engines, as described for FIG. 1, be able to rotate at the same rotational speed since they are connected with an identical transmission ratio X from the internal transmission shafts TS and TD to the output shaft 11.

It should be noted that, in the case of a compact powertrain for use with electric engines or for boats, the number of gears of the compact gearbox as described is lower, i.e., two ratios plus the rotation inverter if required, this following the different mode of generating the rotation of the electric engines or of propeller motion propulsion in water compared to the mode of contact of the wheels of a vehicle on the ground.

Moreover, it is clear that at any operating moment of the transmission the engines may not cooperate, one of the two may be stopped, or be carrying out a transmission ratio change, i.e., with the corresponding open clutch, or they may also collaborate contributing to the motion of the vehicle each with the transmission ratio inserted, but obtaining on the output shaft 11 the sum of the power and torque generated by each thereof. Given the advantage of sizing the entire engine assembly, the clutch assembly and the transmission gears on the left transmission shafts TS and right transmission shafts TD, i.e., sizing the teeth thereof for the only torque and power generated by a single left 7 or right 8 engine. Correspondingly, the gear on the output shaft of the transmission is also sized for the single power and torque transmitted by each engine. Only the output shaft itself must be sized for the power and torque sum of the powers and torques generated and summed in the output shaft 11 of the transmission, so as to use all the torque and power generated by the compact powertrain in the transmission to generate the desired motion of the vehicle.

In fact, if it is evident that the gears mounted on the left transmission shafts TS and right transmission shafts TD can be sized to the power and torque of the single engine as each contributes the power and torque of the connected engine to the transmission, it should be noted that the gears which receive the motion on the output shaft of the transmission 11 have a gear which is always single with a gearing wheel of the left transmission shaft or right transmission shaft, at most a double gear on the same wheel, present on the output shaft of the transmission 11, when the rotational motion RS and RD insists on the same wheel even if with different transmission ratios of FIG. 1. Also in this case the pressure between the gear teeth in the gear is always limited to the single torque and power of one of the two engines; only the stress of the tooth occurs twice at each turn of the gear wheel, i.e., the stress frequency becomes double, without significantly decreasing the resistance capacity of the tooth stressed by the double gear at each turn.

Figure 5:
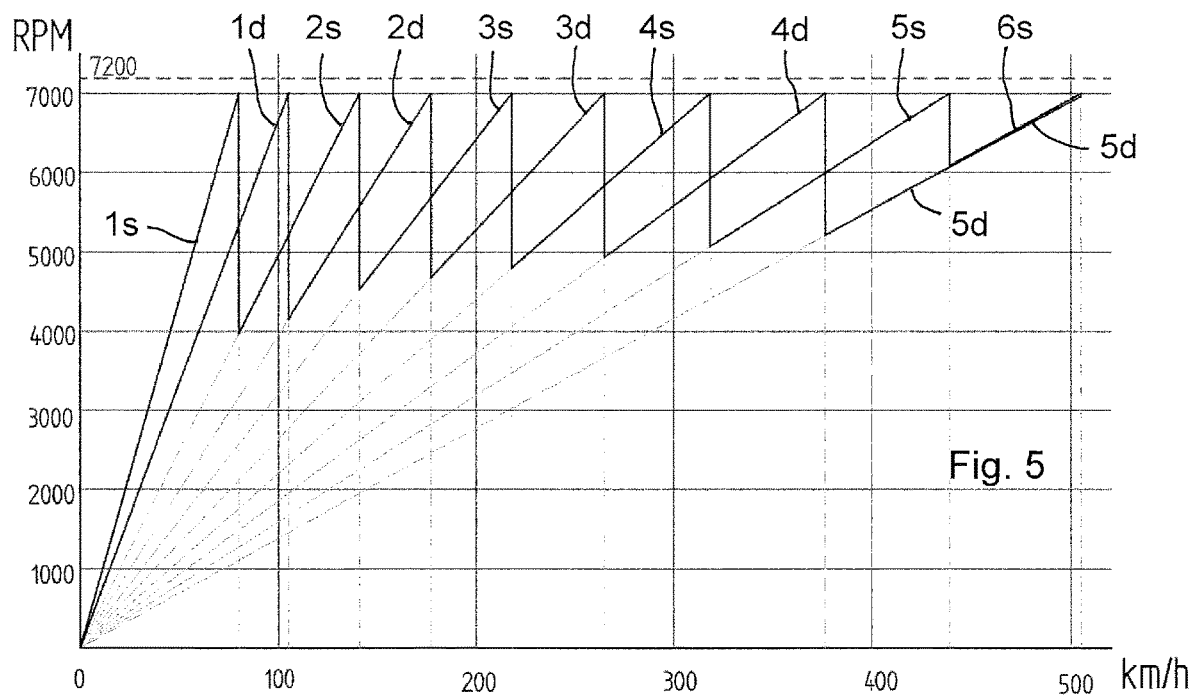
FIG. 5 depicts a schematic diagram of the rotational speed between the engine speed with respect to the possible speed of a motor vehicle on which the compact powertrain is mounted, with the lines indicating the speed ratio between the rotation of the single engine and the speed of the vehicle on the ground; only at the eleventh ratio will the rotation speed of the two engines which transmit with pairs of gears with the same ratio on the third output shaft of the motion from the gearbox be the same.

The diagram of FIG. 5 shows the variation of the rotational speeds of the engines as the gearboxes vary but at the maximum power and maximum rotation thereof; it is obtained with the lines of the speed ratios included on the pairs of gears always engaged between the left TS and right TD transmission shafts and the output shaft of the transmission 11, with the gear change at the rotation limit speed of each engine 7, for the gears from the left shaft TS, or from the engine 8, for the gears from the right shaft TD. It should be noted in the diagram that the combination of the insertions of the front engagements 12 on the left and right transmission shafts combined with the insertions of the front engagements on the output shaft of the transmission 11 can generate six ratios 1s, 2s, 3s, 4s, 5s and 6s in the transmission of the rotary motion RS from the left transmission shaft TS and correspondingly five ratios 1d, 2d, 3d, 4d and 5d in the transmission of the rotary motion RD from the right transmission shaft TD. The combination of the transmission of the rotary motion from the two left and right shafts towards the output shaft of the transmission 11 is conveniently exploited if the ratios are similar, i.e., if the gearing down differences of the rotational speed between the rotary motion RS and RD are minimal, even if nothing prevents combining the operating speeds of the respective left 7 and right 8 engines to be also very different with non-similar inserted ratios. As a result of these very numerous possible combinations in the insertion of the speed ratios between the two left TS and right TD transmission shafts towards the output shaft of the transmission 11, the maximum torque and maximum power can be modulated at will and according to the will of the driver of the vehicle, also by means of an appropriate electronic apparatus for managing the operating and running parameters of the vehicle, not easily manageable by the driver of the vehicle, on which the compact powertrain is mounted.

Finally, the transmission 3 thus obtained, even if only in this first embodiment, allows, in addition to the sum of the power and torque of the individual engines of the engine assembly 2, also the operation of a single left engine 7 or right engine 8 and the use of the compact powertrain with a level of torque and power limited to the torque and power, obviously less than the total, developed by the left engine 7 or the right engine 8. Obviously, with only one engine running, a limited number of transmission ratios can be obtained: six for the left engine and five for the right engine, and other ratios with the use of the transmission ratios obtainable by reversing the torque produced by one engine through the gears of the opposite transmission shaft towards the output shaft 11; moreover, a vehicle provided with the compact powertrain described here can reverse, if a land vehicle, or rotate the propeller in the opposite direction, if a boat with rotational motion coming indifferently from the right or left engine.

A constructive solution with greater versatility is depicted in FIGS. 14 to 21 in which the connection of the left or right engine and the set transmission ratio is not limited as the previous constructive solution; here the constituent parts and with the same function are indicated with identical references. In fact, in FIGS. 14 and 15, in the diagram of the transmission of the compact powertrain, of FIG. 1, a pair of gears Xc is inserted which, in addition to allowing rotation correspondence at the same speed as the shafts TS and TD in the longest gear, the pair of gears being free to rotate on the output shaft 11 of the transmission, allows the continuous connection between the left transmission shaft TS and the right transmission shaft TD, if there is the simultaneous insertion of the corresponding front engagements 12*s* and 12*d* on the respective shafts, left and right, with identical transmission ratio. That is, only with the insertion of the central front engagement 11*c* and obviously the insertion of both front engagements 12 on the respective shafts, can transmission occur in the longest gear; instead, with this embodiment with the central front engagement 11*c* disconnected, but with both the corresponding front engagements 12*s* and 12*d* inserted, the rotary motion can be transferred from one transmission shaft to another with the same rotational speed. This connection allows to make the transmission more versatile, i.e., it makes which engine 7 or 8 is active while allowing the exploitation of all the transmission ratios present in the gearbox 10 independent.

The transmission of the rotational motion occurs as illustrated in FIGS. 16 to 21 in which the transfer of the rotation between the two transmission shafts TS and TD is shown, for the various connections further to what is described, made possible here by the pair of gears Xc with the transmission regardless of which of the two shafts is active.

Figure 16:
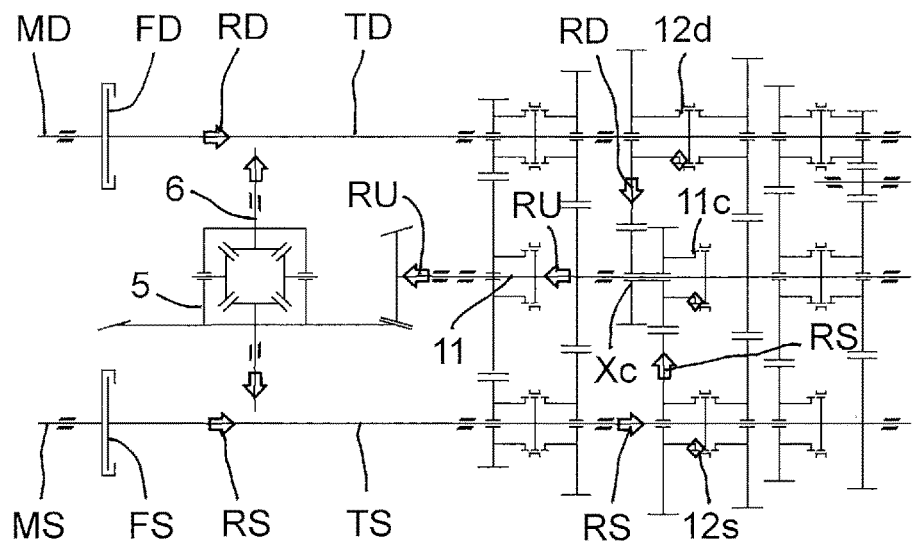
FIG. 16 depicts the diagram of the transmission of the rotary motion entering from the two engines, i.e., by closing the respective clutches with the sum of the torque generated by each engine on the output shaft through the double idle gear connected to the output shaft.

In fact, FIG. 16 shows the input of the rotation from both the left, TS, and right, TD, shafts, with the closure of the corresponding clutches, FS and the motion which comes from the engine 7, and the clutch of the right shaft FD and the motion which comes from the engine 8, i.e., both engines rotate. The transmission of the rotation RS is transmitted for the insertion of the front engagement 12*s* so as to rotate the pair of gears Xc which, given that the insertion of the front engagement 11*c* connects the pair of gears to the output shaft 11 of the transmission; the transmission of the rotation RD is transmitted for the insertion of the front engagement 12*d* so as to rotate the pair of gears Xc which, given that the insertion of the front engagement 11*c* connects the pair of gears to the output shaft 11 of the transmission; given the pre-ordered and unitary 1:1 ratio of the gears which engage with the torque Xc the rotation of the two shafts TS and TD results in the same rotational speed. Similar to what is described in FIG. 11, the sum of the transmitted torque is obtained but at the same rotational speed of the two right and left engines. That is, the output rotation RU is obtained for a transmission ratio between the right TD or left TS transmission shaft to the output shaft 11, while the other gears on the transmission shafts do not affect the total output transmission ratio.

Figure 17:
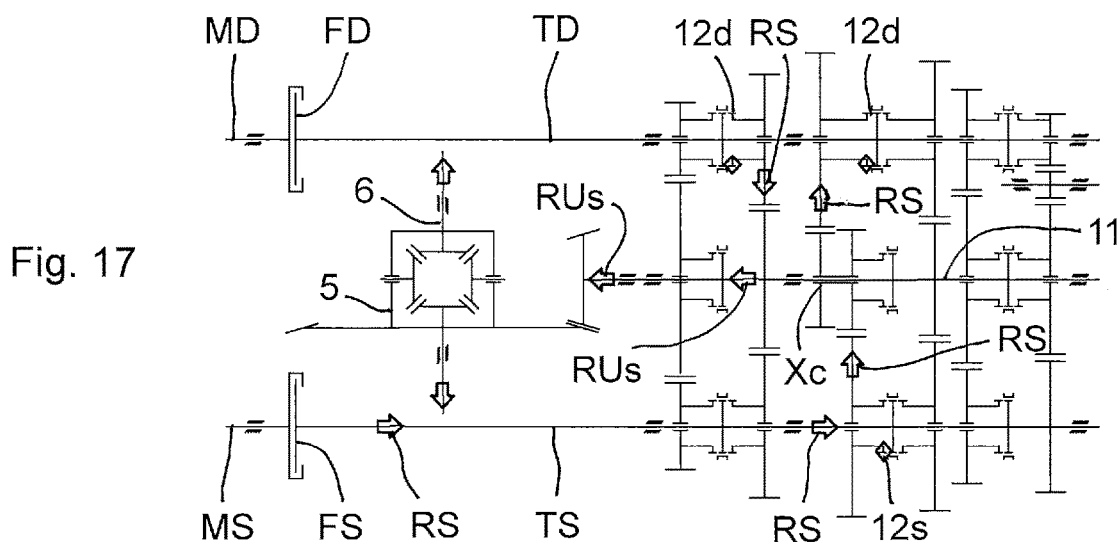
FIG. 17 depicts the diagram of the transmission of the rotary motion entering from the left engine, i.e. through the closing of the left clutch and opening of the right clutch, thus obtaining the transmission of the torque generated by the left engine, towards the double idle gear on the output shaft with the transmission of the motion on the output shaft through a gear ratio between the right transmission shaft and the output shaft.

Similarly, FIG. 17 shows the rotation input from the left shaft, TS, with the closure of the corresponding clutch FS and the motion coming from the engine 7, while the clutch of the right shaft FD must remain open, i.e., the engine 8 can rotate at any speed or be stopped. The transmission of the rotation RS is transmitted for the insertion of the front engagement 12*s* so as to rotate the pair of gears Xc which, given the insertion of the front engagement 12*d* connected thereto transmits the rotation to the right transmission shaft TD; given the pre-ordered and unitary 1:1 ratio of the gears which engage with the torque Xc the rotation of the two shafts TS and TD results with the same rotational speed. The reduction with the ratio obtained occurs on gears of the transmission shaft TD with a second front engagement 12*d* inserted, in a gear with a lower ratio, and the transmission on the output shaft of the transmission 11 on a fixed gear rotating therewith. That is, the output rotation RUs is obtained for a transmission ratio between the right transmission shaft TD and the output shaft 11, while the gears on the left transmission shaft TS do not affect the total output transmission ratio.

Figure 18:
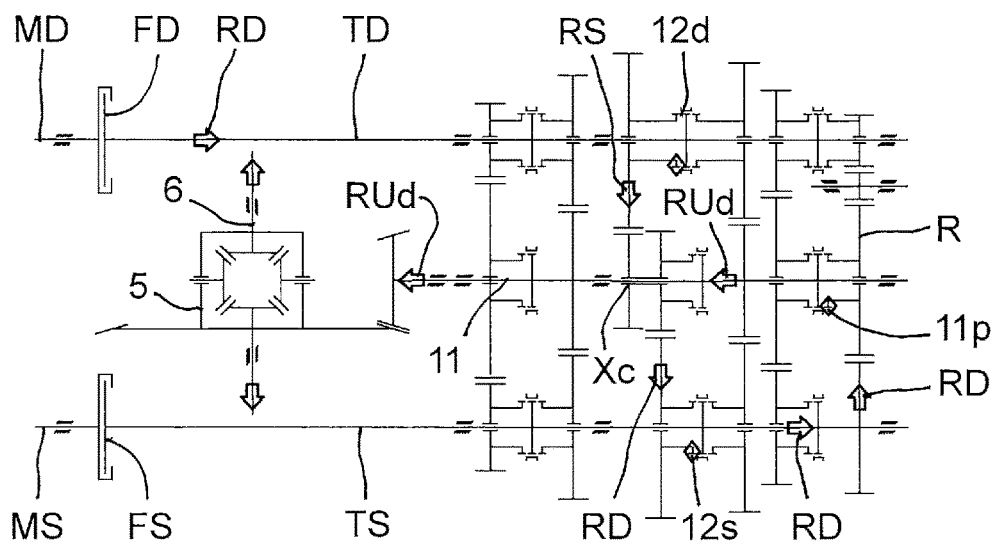
FIG. 18 depicts the diagram of the transmission of the rotary motion entering from the right engine, i.e., through the closing of the right clutch and opening of the left clutch, thus obtaining the transmission of the torque generated by the right engine, towards the double idle gear on the output shaft with the transmission of motion on the output shaft through a gear ratio between the left transmission shaft and the output shaft.

Furthermore, FIG. 18 shows the rotation input from the right shaft, TD, with the closure of the corresponding clutch FD and the motion coming from the engine 8, while the clutch of the left shaft FS must remain open, i.e., the engine 7 can rotate at any speed or be stopped. The transmission of the rotation RD is transmitted for the insertion of the front engagement 12*d* so as to rotate the pair of gears Xc which, given the insertion of the front engagement 12*s* connected thereto transmits the rotation to the left transmission shaft TS, which as mentioned keeps the rotational speed constant. The reduction with the ratio obtained occurs on a gear of the transmission shaft TS with the insertion of the front rear engagement 11*p* on the output shaft of the transmission 11. That is, the output rotation RUd is obtained for a transmission ratio between the left transmission shaft TS and the output shaft 11 through the gear pair with the idle gear R connected to the shaft 11 by the engagement 11*p*, while the gears on the right transmission shaft TD do not affect the total output transmission ratio.

Figure 15:
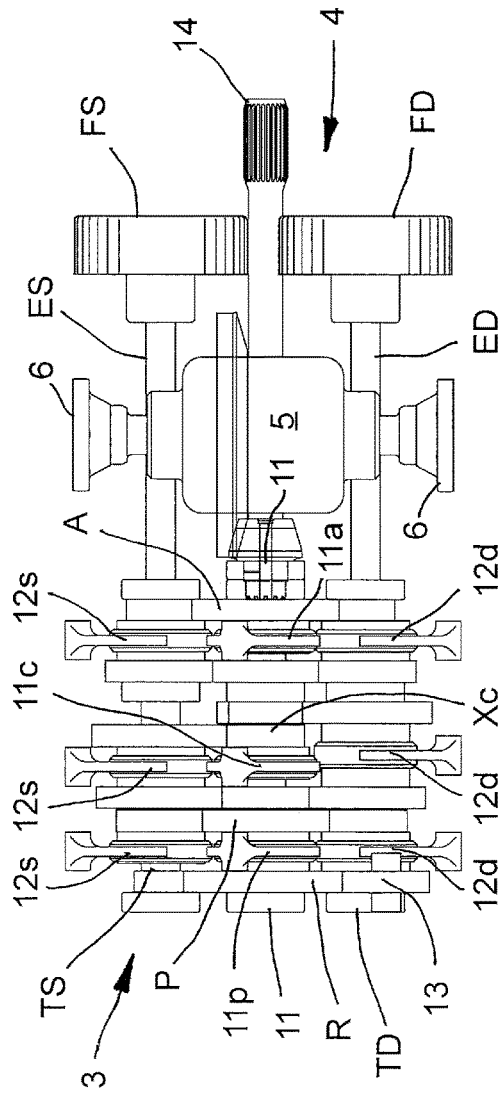
FIG. 15 depicts a schematic plan view of the transmission of the rotary motion from the clutches to the pairs of gears of the gearbox and to the differential for the traction axle of a motor vehicle, i.e., the transmission plan of FIG. 14.
Figure 14:
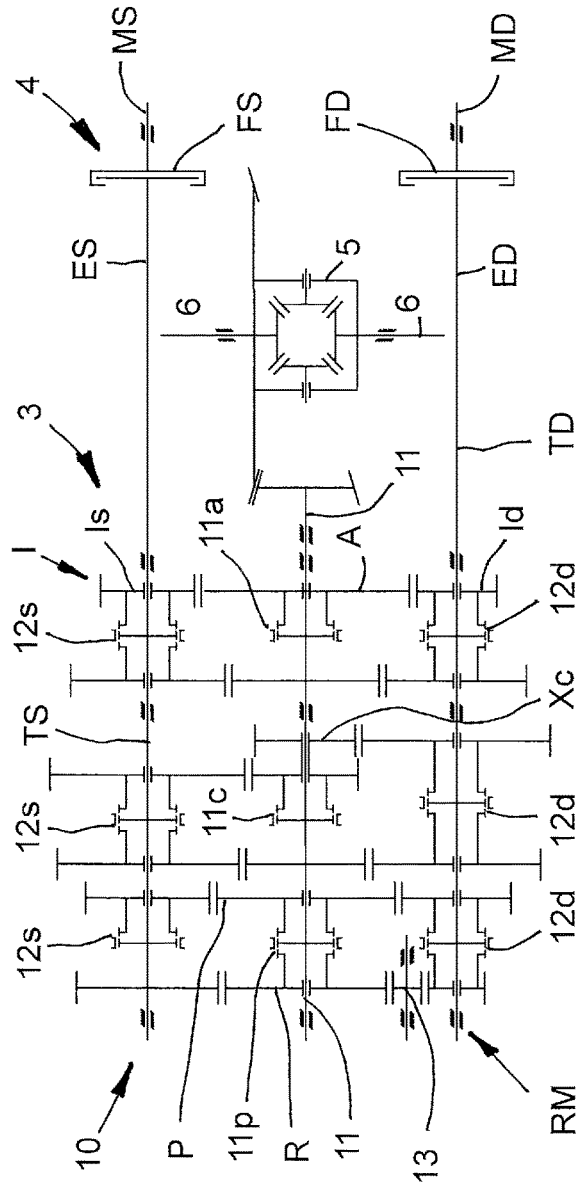
FIG. 14 depicts a diagram of the transmission members according to a further transmission embodiment of the invention; in it the transmission of motion from the two shafts, separate and rotating independently of the torque input, is connected at will with the third output shaft also through a ratio with equal reduction through a double idle gear on the output shaft, achieving the independence of the desired transmission ratio present on the shaft itself or opposite to that of the input of the rotation with respect to the active drive shaft.
Figure 19:
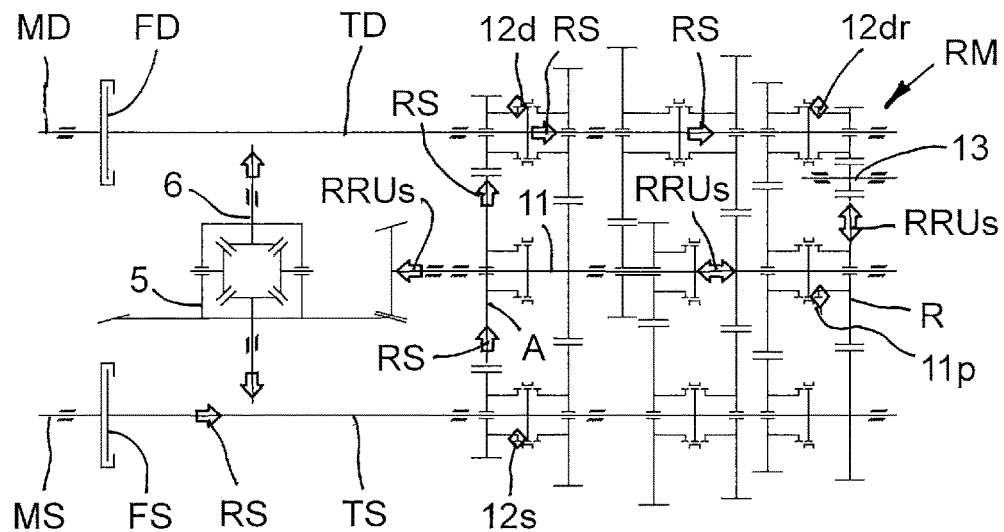
FIG. 19 depicts the diagram of the transmission of the rotary motion entering from the left engine, i.e., through the closing of the left clutch and opening of the right clutch, thus obtaining the transmission of the torque generated by the left engine, towards the idle gear on the output shaft with the transmission of the motion on the output shaft through a gear ratio between the right transmission shaft and the output shaft with the insertion of the reverse ratio.
Figure 20:
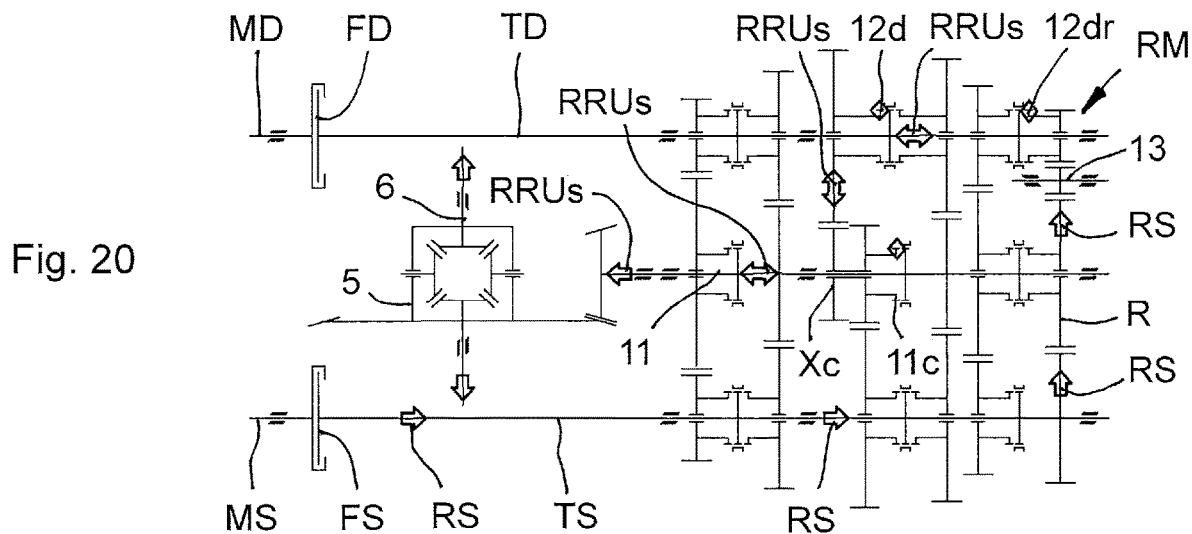
FIG. 20 depicts the diagram of the transmission of the rotary motion entering from the left engine, i.e., through the closing of the left clutch and opening of the right clutch, thus obtaining the transmission of the torque generated by the left engine, towards a different idle gear on the output shaft, to achieve a different reverse ratio, with the transmission of the motion on the output shaft from the right transmission shaft through a gear of the pair of idle gears to the output transmission shaft connected thereto.
Figure 21:
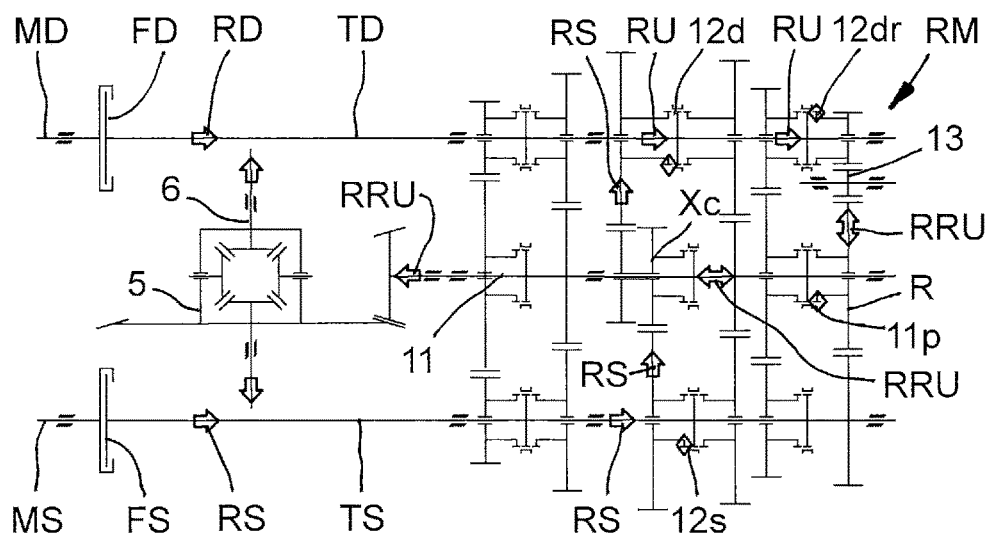
FIG. 21 depicts the diagram of the transmission of the rotary motion entering from both engines, so as to obtain the sum of the torque, towards the gear of the reverse ratio, with the transmission of the motion to the output shaft from both transmission shafts through the counter-rotation gear to impart to the output shaft for the reverse gear.

This variant obtains further advantages over the constructive solutions described with the reverse gear, which are illustrated in FIGS. 19 to 21 where the transmission with the features described in FIGS. 14-15 is used with the transmission shafts TS and TD for different speed and torque ratios for the reverse gear. FIG. 19 shows the transmission of the rotation from the left shaft TS with insertion of the reverse gear on the shaft TD. This is possible with the closure of the corresponding clutch FS and the motion which comes from the engine 7, while the clutch of the right shaft FD must remain open, i.e., the engine 8 can rotate at any speed or be stopped. The transmission occurs from the shaft TS with the insertion of the engagement 12s thereon and the transmission of the torque RS through the idle gear A, free to rotate on the shaft 11, and the closure of the corresponding engagement 12d on the shaft TD; a second coupling 12dr rotatably connects the reverse gear countershaft 13 with TD. The reverse gear rotation RRUs is transmitted to the output shaft 11 for connecting the engagement 11p of the idle gear R.

FIG. 20 shows a second transmission of the rotation from the left shaft TS with insertion of the reverse gear on the shaft TD. This is possible with the closure of the corresponding clutch FS and the motion which comes from the engine 7, while the clutch of the right shaft FD must remain open, i.e., the engine 8 can rotate at any speed or be stopped. The transmission occurs from the shaft TS from the last gear thereof and the transmission of the torque RS through the idle gear R, free to rotate on the shaft 11, and the reverse gear countershaft 13 and the closure of the corresponding engagement 12dr on the shaft TD; a second engagement 12d rotatably connects with TD, the double idle gear Xc. The reverse gear rotation RRUs is transmitted to the output shaft 11 for connecting the engagement 11c of the double idle gear Xc.

Finally, FIG. 21 shows the sum of the rotation torques RS and RD with the gearbox of FIG. 14 with reverse operation. The combination of the torques with the reverse gear is shown here with the input of the rotation from both the left, TS, and right, TD shafts, with the closure of the corresponding clutches, FS and the motion which comes from the engine 7, and the clutch of the right shaft FD and the motion which comes from the engine 8, i.e., both engines rotate. The transmission of the rotation RS is transmitted for the insertion of the front engagement 12s so as to rotate the pair of gears Xc which, given that the idle rotation on the shaft 11 transmits the rotational torque RS to the shaft TD for the insertion of the corresponding front engagement 12d; given that the pre-ordered and unitary 1:1 ratio of the gears which engage with the torque Xc, the rotation of the two shafts TS and TD results in the same rotational speed. Thus, the sum of the transmitted torque RS+RD=RU is obtained on the internal transmission shaft TD and, with the connection of a second front engagement 12dr, the sum torque RU is transmitted from the right shaft TD to the output shaft 11 through the countershaft 13 of the reverse gear RM and the connection of the gear R to the output shaft with the engagement 11p. That is, the output rotation RU is obtained for the same transmission ratio between the right TD or left TS transmission shaft towards the output shaft 11, and the gears involved geared with the countershaft 13, if not specifically sized, limit the torque transmissible in reverse.

Figure 22:
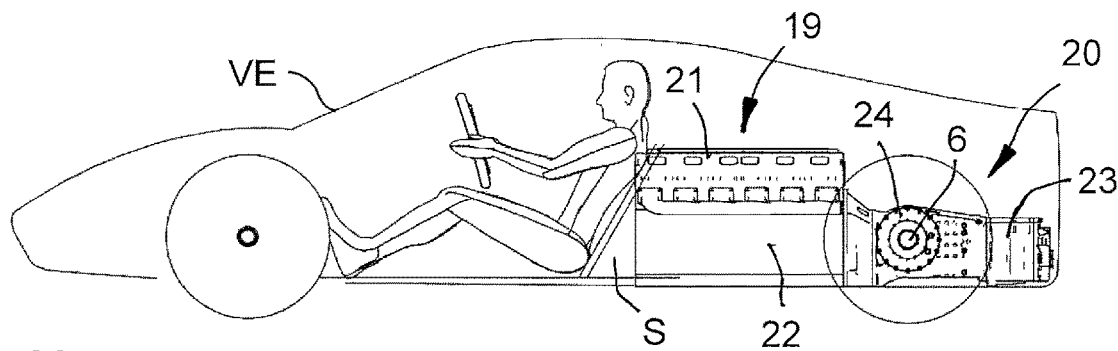
FIG. 22 depicts a schematic view alongside a construction of a very high-performance motor vehicle provided with a 12 V-cylinder drivetrain of a type which is known and usual in the art.
Figure 23:
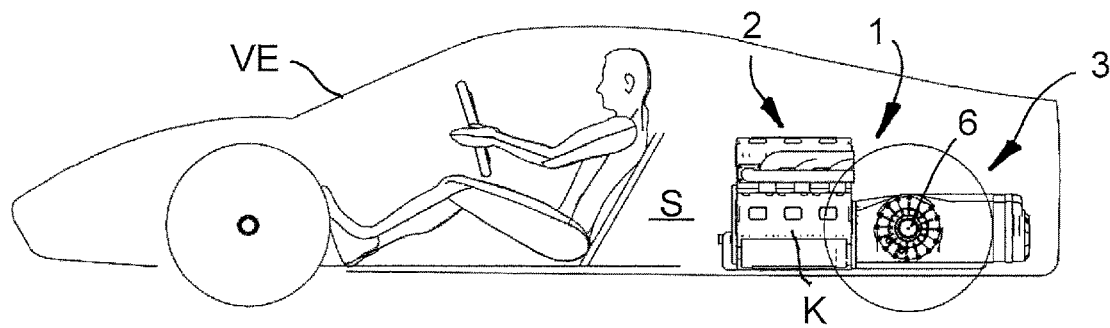
FIG. 23 depicts a schematic view alongside a construction of a very high-performance motor vehicle provided with a drivetrain in the same power and for the same use as the vehicle of FIG. 22, here provided with the compact powertrain of FIG. 10.
Figure 24:
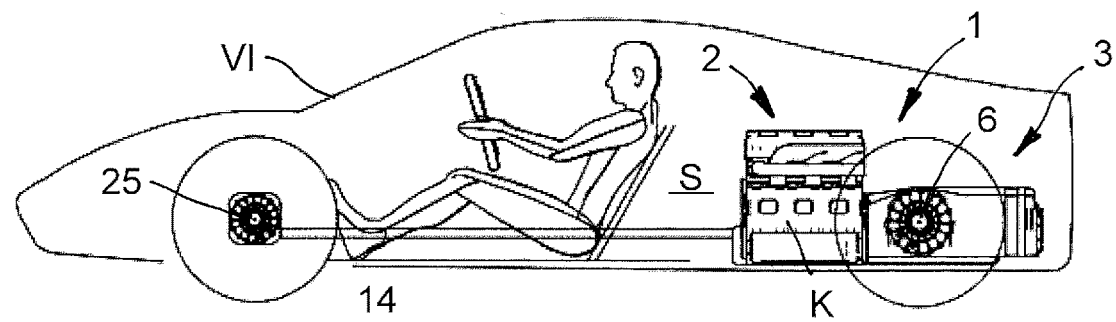
FIG. 24 depicts a schematic view alongside a construction of a motor vehicle as in FIG. 23, here also provided with the motorization of the front axle of the vehicle.
Figure 25:
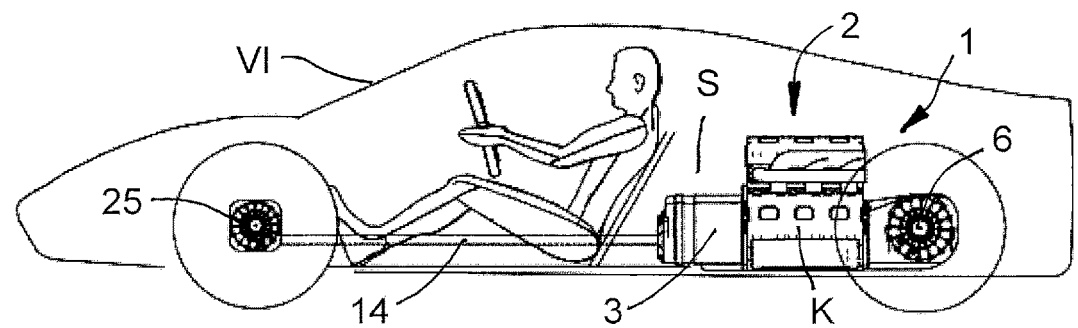
FIG. 25 depicts a schematic view alongside a construction of a motor vehicle as in FIG. 23, provided here with a different arrangement between gearbox and differential on an axle of the motor vehicle from opposite parts of the engine crankcase of the compact powertrain.
Figure 26:
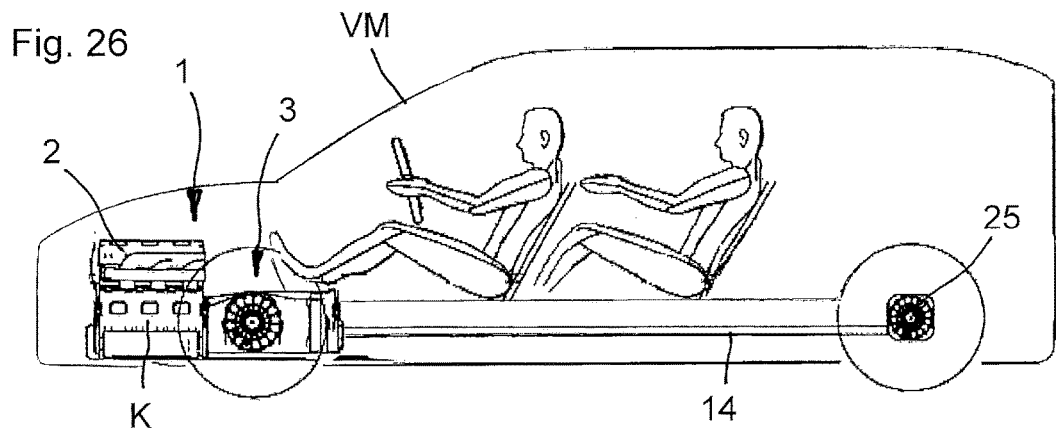
FIG. 26 depicts a schematic view alongside a construction of a motor vehicle of the minivan type with transmission to the four drive wheels and provided with a drivetrain according to one of the aforementioned embodiments, here provided with the compact powertrain housed in the front.

Furthermore, FIGS. 22 to 27 depict a comparison of an advantageous embodiment of a motor vehicle with extreme performance, i.e., high power and also torque, in which a conventional twelve V-cylinder engine 19 is combined with a conventional transmission 20. The conventional engine 19 has two cylinder banks 21, i.e., six cylinders in a row with a very long conventional engine crankcase 22 to support six cranks. The conventional transmission 20 comprises a gearbox 23 and a differential 24 for transmitting the rotary motion to the drive axle of the motor vehicle 6. On the other hand, the compact powertrain 1 has a much shorter engine assembly 2 compared to the conventional engine 19 and transmission 20. The comparison of the passenger compartment of the vehicle made in FIGS. 22 and 23 shows that for the same power and torque installed on the vehicle VE the free space S available to passengers in the passenger compartment is certainly greater and the masses of the compact powertrain 1 are certainly much lower than the conventional engine and transmission. Thus a four-wheel drive vehicle VI has a further differential 25 on the front axle connected to the transmission assembly 3 with the transmission shaft to the second axle 14. FIGS. 24 and 25 show different embodiments of the transmission arrangement of the compact powertrain 1 with the arrangement of the transmission assembly cantilevered in the rear or in a central position of the vehicle. Finally, as examples of application to the vehicles in FIGS. 26 and 27, two other constructions of vehicles are shown, namely a minivan VM and a sports car VA with an engine in front of the driver and with all-wheel drive.

Further variants obtain advantages over the embodiments described and illustrated in FIGS. 28 to 33 in which the transmission with the features described in FIGS. 14-15 is implemented by inserting front disconnection engagements 15s and 15d between the respective input shafts ES, ED and the transmission shafts TS and TD. The arrangement of these front disconnection engagements between the right and/or left shafts allows to completely separate the transmission part and the differential with the gearbox 10 from both endothermic and electric engines and also from the clutches themselves FS and FD so as to avoid a continuously controlled opening, for certain conditions of use, of one of the clutches with the danger of damaging it.

Figure 28:
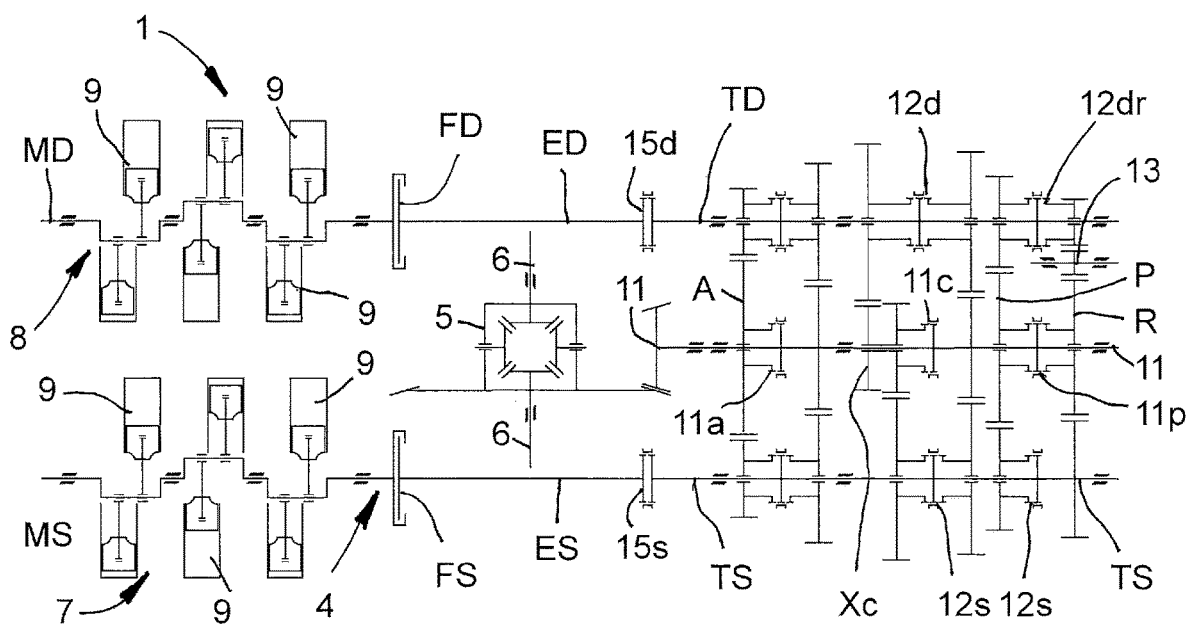
FIG. 28 depicts the diagram of the members of the compact powertrain according to the fourth transmission embodiment of the invention of FIG. 19 combined with a compact powertrain with two drive shafts and six V-cylinders each.
Figure 29:
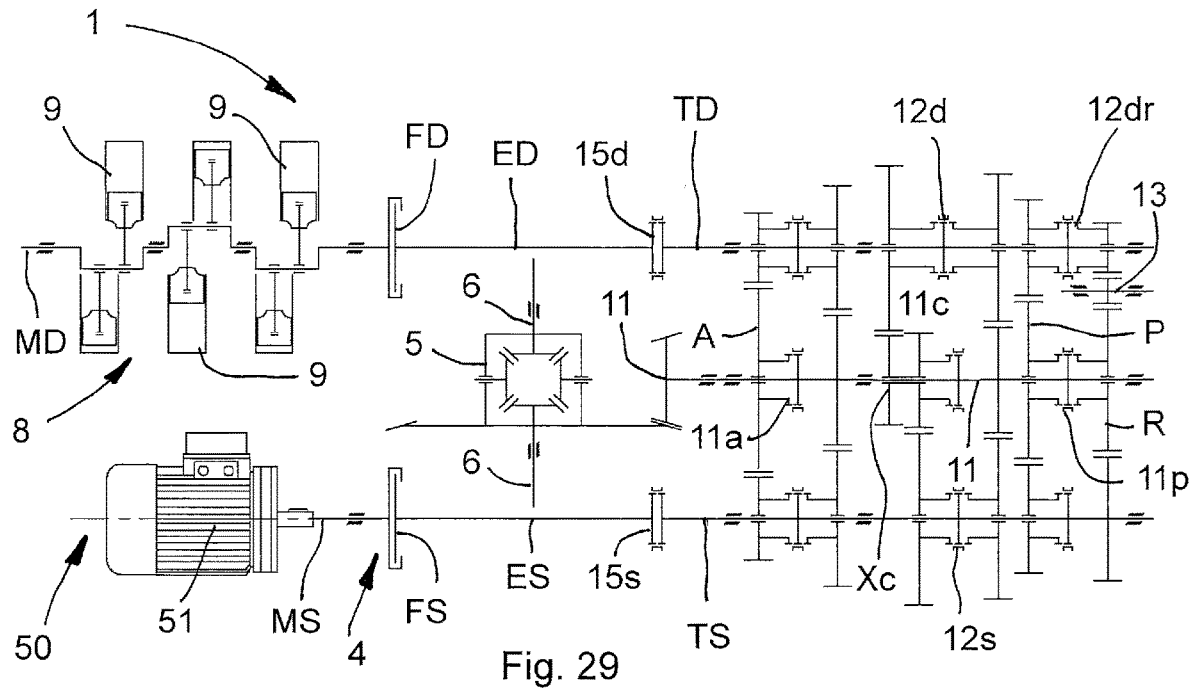
FIG. 29 depicts the diagram of the members of the compact powertrain according to the fourth transmission embodiment of the invention of FIG. 14 combined with a compact powertrain with one drive shaft and six V-cylinders and an electric engine in combination with the endothermic engine.

The transmission assemblies with gearbox illustrated in FIGS. 14-15 are shown with diagrams of the connections with various types of engines and by inserting said front disconnection engagements 15s and 15d between the transmission shafts. The motorization of FIG. 28 shows the diagram of the transmission of FIG. 14 and the engine assembly 2; FIG. 29 shows the powertrain 1 with a hybrid motorization 50 where one of the endothermic engines, here the left engine, is replaced by an electric engine 51 which also acts as a generator in situations of the vehicle braking or slowing down on downhill paths.

Figure 30:
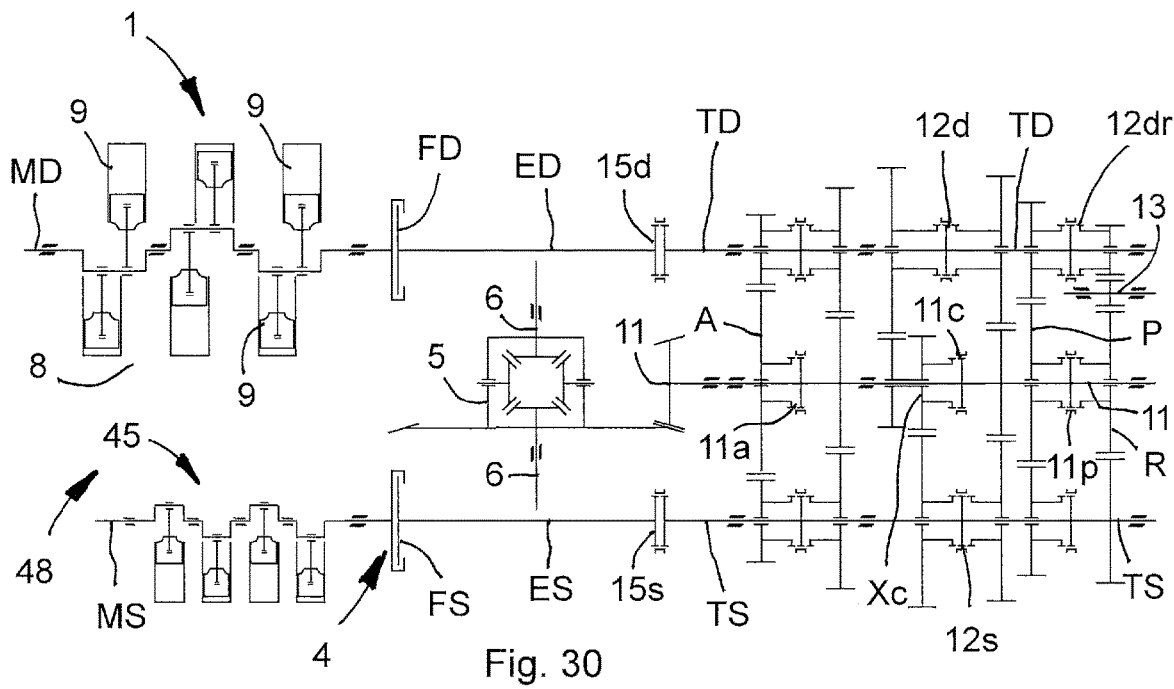
FIG. 30 depicts the diagram of the members of the compact powertrain according to the fourth transmission embodiment of the invention of FIG. 14 combined with a compact powertrain with one drive shaft and six V-cylinders and an endothermic engine with four cylinders in line on the second drive shaft.
Figure 31:
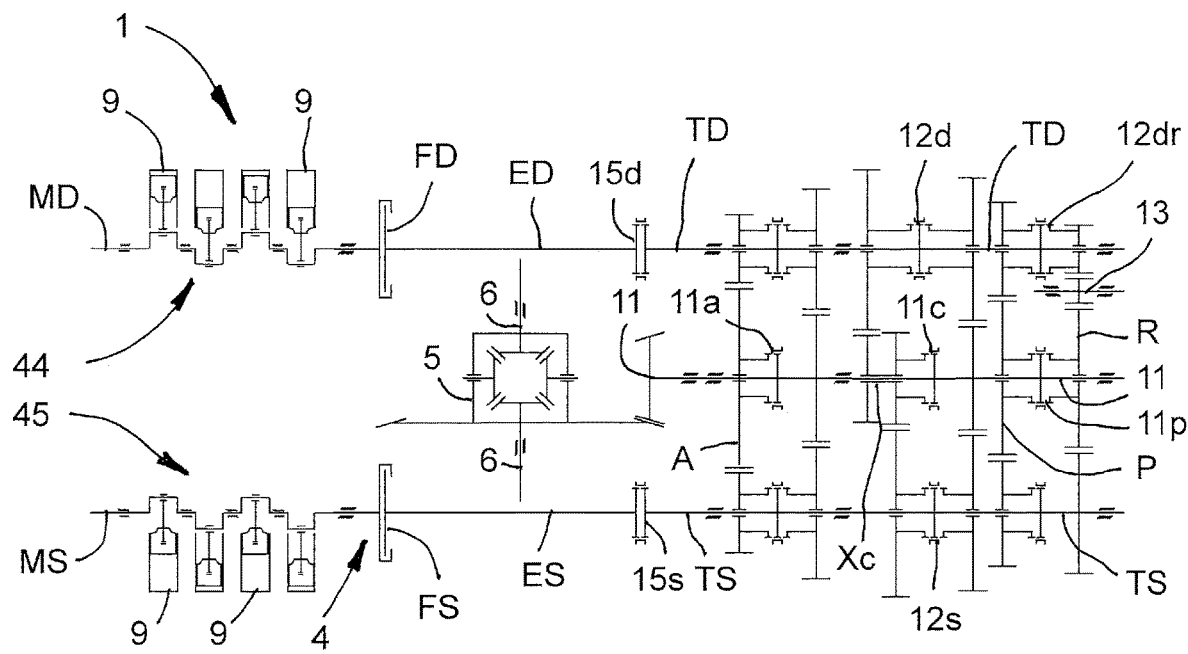
FIG. 31 depicts the diagram of the members of the compact powertrain according to the fourth transmission embodiment of the invention of FIG. 14 combined with a compact powertrain with two drive shafts and four cylinders in line each.
Figure 32:
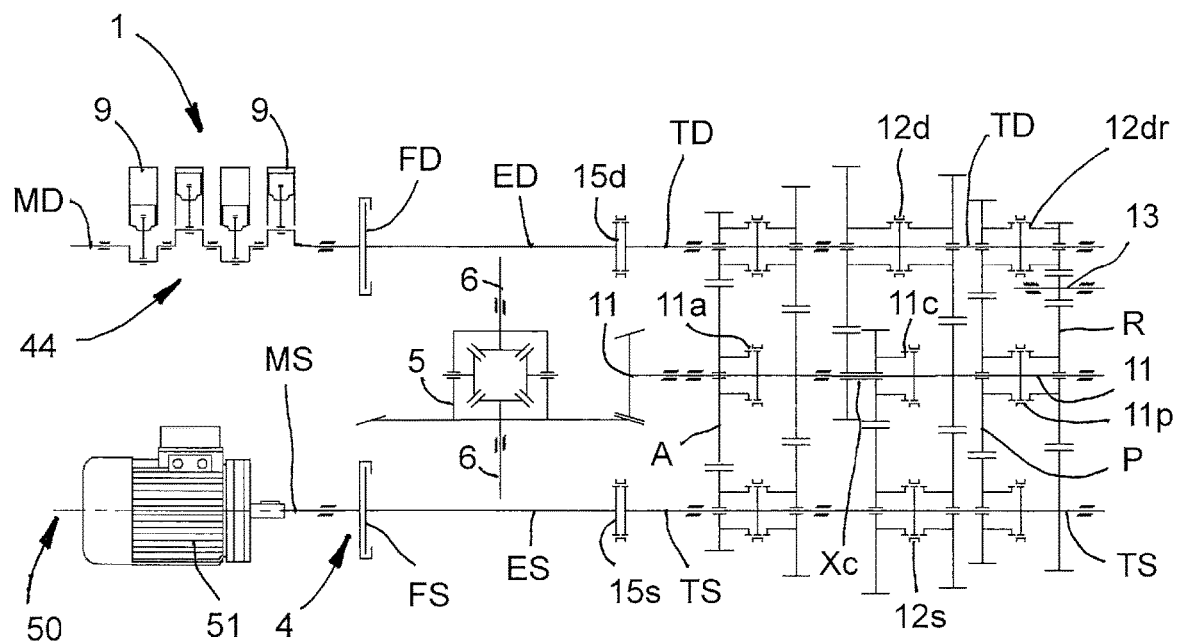
FIG. 32 depicts the diagram of the members of the compact powertrain according to the fourth transmission embodiment of the invention of FIG. 14 combined with a compact powertrain with one drive shaft and four in-line cylinders and an electric engine in combination with the endothermic engine.

Finally, FIGS. 30, 31 and 32 show examples of varied motorization with the adoption of two endothermic engines of different power FIG. 30, i.e., the engine assembly 48 was created with the aim of diversifying the operating speeds of the two engines, i.e., the right engine 8 has the maximum power concentration, while the left engine 45 is a lower power engine for the movements of the vehicle in which full power is not required. Furthermore, the further motorization variant of FIG. 31, in which the two engines 44 and 45 appear with the engine assembly with cylinders in line which, for the adoption of the transmission with disconnection engagements, is versatile with the possibility of preferential exclusion of an engine with the interposition of the front disconnection engagement. Similarly, the hybrid motorization 50 associated with a medium or low power engine, FIG. 32, can benefit from the transmission assembly 3 described thus far with the advantage of achieving a large number of transmission ratios, but simultaneously being able to disconnect both the endothermic engine and the electric engine at will, setting the front engagements present on the transmission shafts TS and TD at the particular value at which the one or the other engine must intervene in the generation of the torque or, on the contrary, for the electric engine to act as a generator, i.e., braking the vehicle. The transmission shown in the diagram of FIG. 32 allows to choose the value of the most suitable transmission ratio in propulsion, but, for the versatility described above, also to adjust the regenerative braking torque which the electric traction engine, operating as a generator, can develop by releasing the same from a fixed transmission ratio with the endothermic engine and/or with the wheels or the differential 5.

Figure 33:
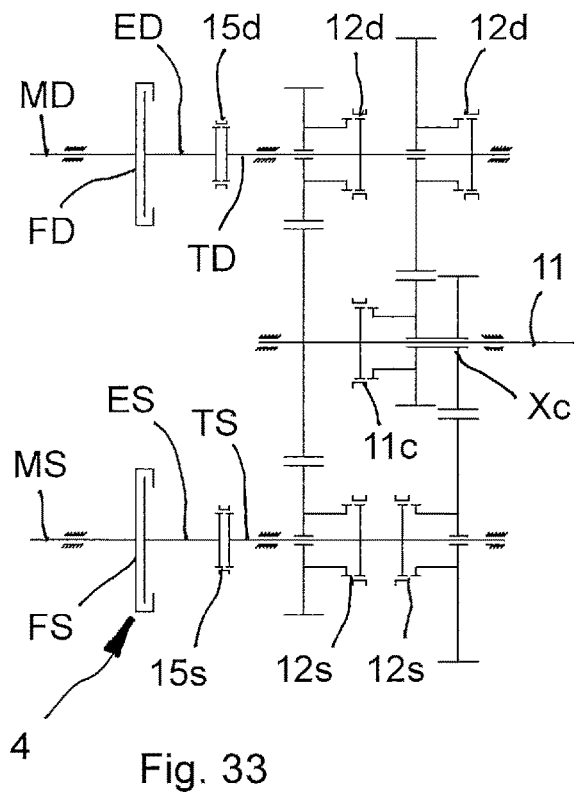
FIG. 33 depicts the diagram of the transmission of the rotary motion entering from two electric engines, not depicted, for a compact powertrain in which the transmission is obtained as in a motor vehicle but only with electric propulsion; rotation reversal is not envisaged as both engines can reverse the direction of rotation; the transmission features, i.e., through the closure of the respective clutches and engagements on the drive shafts, allows the sum of the torque generated by each engine on the output shaft; furthermore, the rotation of the output shaft can be associated with gears mounted indifferently on one of the two internal transmission shafts, right or left, with the output rotation on the third shaft, as obtained for the transmission of a motor vehicle described.

A further variant of the transmission for the compact powertrain 1 in FIG. 33 shows a transmission for two electric engines which are connected to a gearbox with a reduced number of gears, but which has two ratios, obtained, as in the case of the construction of the vehicle with the input of the rotational motion from two drive shafts MS, left, and MD, right, which transmit the motion to the two transmission shafts TS, left, and TD, right, in turn connected with pairs of gears to the output shaft 11 from the transmission, which is always connected in rotation with the use of the torque and power transmitted in the vehicle; the rotational inversion is not included, given the possibility of the electric engines to rotate in both directions. The clutch assembly 4 with the FS, left, and FD, right, clutches allows the insertion of only one or both electric engines, not shown, as already described for the transmission assembly 3, so to obtain the use functionality of the torque generated by the engines there is a double idle gear Xc which can rotate freely on the output shaft 11 from the gearbox and with a front engagement 11c it can be connected in rotation. In FIG. 33, the front disconnection engagements 15d and 15s are also visible, and with the same functionality as the corresponding front disconnection engagements between the shafts of the previous constructive diagrams.

Figure 34:
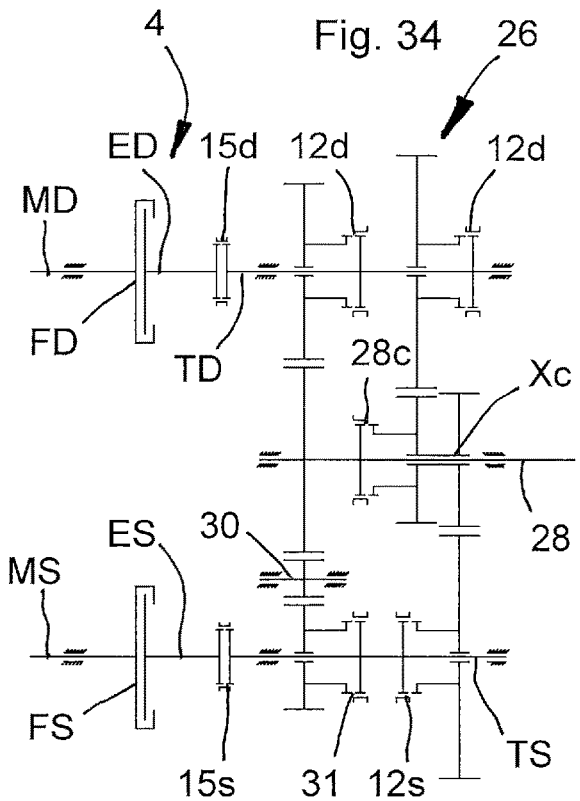
FIG. 34 depicts the diagram of the transmission of the rotary motion entering from the two engines for a compact powertrain for a boat, i.e., by closing the respective clutches with the sum of the torque generated by each engine on the output shaft; the presence of both rotation input shafts with the respective individual clutches for each engine of the powertrain is associated with gears mounted on the two transmission shafts and output on a third shaft, as obtained for the transmission of a motor vehicle; there is also the rotation inverter of the propeller between an input shaft and the third transmission shaft connected to the propeller.

FIGS. 34 to 39 show a transmission assembly for a boat 26 which has a number of two ratios, obtained, as in the case of the vehicle construction with the input of the rotational motion from two drive shafts MS, left, and MD, right, which transmit the motion to the two transmission shafts TS, left, and TD, right, in turn connected with pairs of gears to the gearbox output shaft 28, which is always connected in rotation with the axis line shaft of the propeller 29; the rotation inversion of the axis line is obtained with the gear 30 and front inverter engagement 31, similar to the version for the propulsion of a land vehicle. The clutch assembly 4 with the FS, left, and FD, right, clutches allows the insertion of only one or both engines 7 and 8, as already described for the transmission assembly 3, so to obtain the use functionality of the torque generated by the engines there is a double idle gear Xc which can rotate freely on the output shaft 28 from the gear and with a front engagement 28c. In FIG. 34, the front disconnection engagements 15d and 15s are also visible, and with the same functionality as the corresponding front disconnection engagements between the shafts of the constructive diagrams for land vehicles.

The boat B has a cockpit Z where a pair of compact endothermic powertrains 1 is installed, here provided with the specific transmission assembly for boats 26, as used on boats, i.e., with double powertrain on two paired propellers. The cockpit Z has reduced occupancy in the boat for a substantial part with respect to a usual cockpit 32, as seen in FIGS. 36-39, in which in the latter, the cockpit is made in the same size as FIG. 38, i.e., the overall dimensions of the compact endothermic powertrains 1 is smaller than the usual motorization 33 with similar power, obtained with two engines per assembly, right and left, which activate axis lines 28 identical to the embodiment of FIGS. 36, 37 and 38 made for the compact endothermic powertrains of the present invention.

Figure 35:
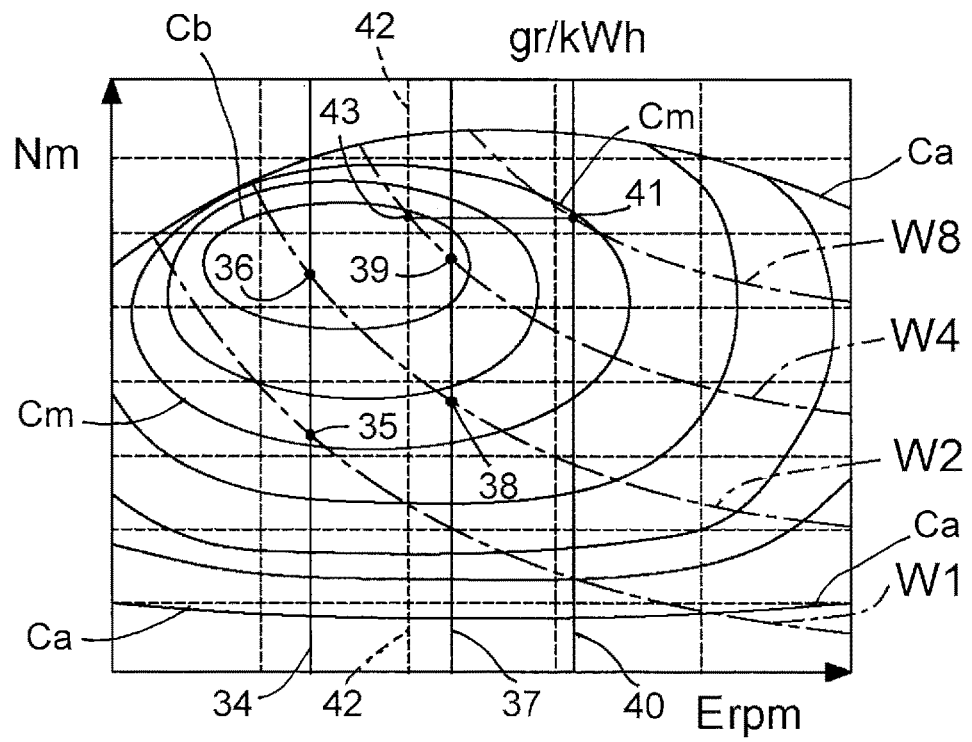
FIG. 35 depicts a schematic diagram of the operating ratio of the powertrain on a boat with the relationship between the number of revolutions, torque developed and power generated, as well as with specific consumption calculated on the grounds of the energy developed in the propulsion.

FIG. 35 shows the summary diagram of the torque curve and at constant power required by a boat to navigate with the rotation of the engine on the axis line at a predetermined propeller rotational speed; in addition to the torque curves with constant power, with propeller with single endothermic engine, the equidistant efficiency curves of the specific consumption in gr/kWh of fuel for the propulsion of the boat is shown. The abscissa shows the instantaneous rotation Erpm of the propeller 29 and the ordinate shows the torque value in Nm; the curve W1 indicates the first level constant power curve, for example 100 kW, then, with W2 the constant power curve of double value, for example 200 kW, and with W4 the constant power curve of quadruple value, for example 400 kW. For the specific use of naval propulsion, to obtain the propulsion required for the boat, the propeller 29 must operate at a very precise rotational speed and the compact powertrain 1 with transmission assembly for boats 26 helps in this regard. Thus, the points of intersection are identified on the aforementioned curves, of a precise reference rotational speed, abscissa 34 of low speed for example with 200 kW, of the propeller 29, of a first speed in which 35 is the point of operation on the constant power curve W1 using two engines per powertrain, i.e., on each propeller, which together give the power W2; while on the diagram, the point 36 identifies the point of operation using a single engine, operating at power W2, for each propeller with the same transmission ratio of the transmission assembly per boat 26. Furthermore, wanting to navigate with a higher power, i.e., which requires a rotation of the propeller at the high propulsion speed 37, obtained by increasing the power regulation of the propeller towards the axis line, the operating options with power W4 of 400 kW identify the operating points of 38 of two engines for each propeller, both operating at power W2, while operating with a single engine, always for each propeller, the operating point at power W4 of a single engine is the point 39, certainly more favourable in terms of specific consumption.

That is, it is possible to detect the most advantageous point of operation on the equidistant efficiency curves of the specific consumption. In fact, once identified, point 35 shows the operation of two engines with power W1 and specific consumption Cm of the average consumption curve, higher than the value of the minimum specific consumption curve Cb of point 36 at which the single engine with power W2 works, i.e., a single engine consumes less fuel to achieve the same thrust energy of the boat. Moreover, the equidistant efficiency curves also present a specific maximum consumption curve Ca which is positioned outside the constant power curves of the two propulsion solutions with only one engine running, points 36 and 39, or with two engines running, points 35 and 38. Thus wanting to navigate at maximum power, i.e., at a constant power curve greater than W4, for example W8 with 800 kW, the points of intersection with an abscissa 40 are outside the lower specific consumption curve Cb, since with the direct transmission with a single power engine W8 or two power engines W4 combined, they identify a consumption close to the average specific consumption curve Cm or possibly maximum Ca, point 41. That is, it is only convenient if navigation at said power is imparted to the boat voluntarily accepting the highest consumption. Obviously the propeller rotates at the rotational speed of the abscissa 40, point of intersection with the maximum power curve of the powertrains of the boat, and the consumption is point 41 in the equidistant efficiency curves of FIG. 35, but always with a specific consumption greater than the minimum specific consumption Cb.

Moreover, the possibility of inserting a different transmission ratio between the powertrain with one or two engines and the axis line, i.e., propeller rotation, allows the powertrain with the specific transmission 26 for boats to differentiate the rotational speed of the propeller 29, which always remains the abscissa 40, while, for the different gear inserted by acting on the front engagements 12 of the transmission 26 for boats, the two engines of the powertrain 1 per boat can operate at a lower rotational speed 42, but with the same torque transmitted to the axis line 28 so as to reach an operating point 43 with the same power delivered, precisely W4+W4 i.e., W8, and transmit the necessary power W8 to the propeller 29 to rotate at the speed of the abscissa 40.

In fact, in the compact powertrain 1 for boats the passage from the transmission with the direct ratio, typically always in connection with the axis line 28, to the modified transmission ratio can occur with the action, at different times, of the respective clutch FS and FD of the left 7 and right 8 engines, while the axis line continues the rotation with the propeller 29, similar to what occurs for a land vehicle.

The advantages of a compact powertrain, according to the invention, can be summarized as follows.

Figure 27:
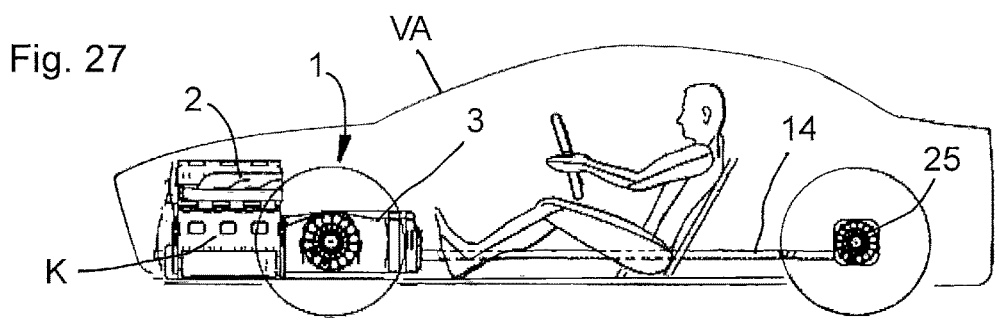
FIG. 27 depicts a schematic view alongside a construction of a high-performance motor vehicle with transmission to the four drive wheels and provided with a drivetrain according to one of the aforementioned high-power embodiments, here provided with the compact powertrain housed in the front.

The doubling of the endothermic engine into two assemblies, i.e., the two left 7 and right 8 endothermic engines, allows for a better distribution of dimensions even in the presence of engines of equivalent power; the reduction of dimensions both on a land vehicle, FIGS. 22-27, and on a boat, FIGS. 36-38, shows how the doubling also of the associated transmission and not separate from the adoption of the pair of endothermic engines leads to a better and more versatile installation. In this, FIGS. 24 and 27 show how a complex all-wheel drive land vehicle can be versatile in the design thereof and in the distribution of the volumes occupied by the mechanics of the vehicle itself, thus allowing to adopt the compact thermal, hybrid or electric powertrain, also for operating machines which usually require rapid reversal of motion even under load, since a feature of the transmission described is obtaining a reversal of motion with different low or high torque ratios transmitted in reverse.

The sizing of the parts constituting the compact powertrain, if made as described herein, has a reduction in overall dimensions in the part of the endothermic engine: the current tendency to create powertrains with an increasingly reduced cylinder capacity is known; moreover, the doubling of the engine obtained together with the doubling of the gearbox 10, as well as of the transmission chain from the drive shafts MD, MS, to the transmission shafts TD, TS, and related coupling rotation gears towards the shaft 11 or 28 of transmission output from the gearbox, allows to obtain a compact powertrain with the sizing of the parts at the single torque and power of the single engine. In fact, as described, only the output shaft 11 in the transmission for ground vehicles, or the output shaft 28, in the transmission 26 for boats, must be sized for the torque and power sum of the torque inputs of the two engines. Even further, the choice to use an endothermic engine architecture with cylinders arranged in a narrow or wide "V" allows to further limit the sizing of the aforementioned engines and the compact powertrain.

Furthermore, a very large advantage, as explained in the previous description, is the arrangement on two rotation input shafts which allows to achieve a high number of transmission ratios without making the gearbox 10 cumbersome; thus the high number of ratios, with the creation of the different wheelbases, Ns and Nd, between each input transmission shaft TS and TD and the output shaft 11 from the transmission, all different ratios so as to achieve, together with the insertion facilitated by the action at different times of the two clutches FS and FD, a very fluid transmission of the torque and power modulating it in all the different speeds of use which a vehicle needs. This modulation is also obtained with the aim of taking due account of the use of both the endothermic and electric engine(s) in the condition of best efficiency and therefore lower consumption obtainable in both the versions for land vehicles and for boats.

Finally, the advantage in the use as described of land vehicles or boats provided with a compact powertrain allows to make the use of part, half or all the available torque/power of a compact powertrain versatile and modulable, still obtaining operation with specific consumption parameters, obviously related to the power developed, always and economically convenient and oriented to energy savings even in endothermic, hybrid or electric compact powertrains of very high power.

In the improved embodiment of FIGS. 14-21, further and important advantages are obtained with respect to the state of the art. The presence of front disengagements 11a, 11p or 11c on the output shaft 11 from the transmission 3, or even 28c in the transmission 26, allows to decouple the pair of idle gears on the output shaft, i.e., they act as rotation transmission gears from a shaft T, right TD or left TS, to the opposite shaft; furthermore, the choice of having the same transmission ratio between TD and Xc and between Xc and TS, necessary for operation at the identical ratio 5d-6s of the diagram of FIG. 5, allows the transfer of the rotary motion at the same speed from one shaft to the other regardless of which engine the rotary motion comes from, as illustrated in FIGS. 17 and 18. This possibility achieves a great advantage by making the use of the pair of gears independent, concerned in determining the reduction of the rotational speed, so as to make it as advantageous and modulable as possible, i.e., by operating the only started engine and operating in the intermediate power/torque speeds, i.e., not maximum, which the compact powertrain can develop in its entirety.

A further and not last advantage results from the possibility of completely interrupting the mechanical connection between a respective input shaft E, right ED or left ES, and the corresponding transmission shaft T, right TD or left TS, obtained by adopting one or both of the front engagements 15, right 15d and/or left 15s, of FIGS. 28-34, i.e., allowing, if necessary, to completely stop, i.e., render inactive, the engine and the clutch connected on the input shaft ES or ED until a further need to change the operating speed of the compact powertrain. This advantage allows the choice of the type of operation of the compact powertrain in intermediate developed power/torque conditions, achieving the objective of obtaining endothermic, hybrid or electric compact powertrains even of medium and/or small power.

To complete the versatility of that which forms the subject of the present description, FIGS. 29, 32 and 33 obtain a significant advantage in the construction of hybrid or completely electric endothermic powertrains which are, for the transmission adopted, also very compact. The presence of at least one electric engine 51, which in braking can operate as a generator, meets the need to achieve, even with hybrid or electric motorization, the maximum versatility of transmission management and therefore of vehicle motion control. Seen from the previous description, the substantial independence of the rotational speed of an endothermic or electric engine with respect to the other allows them to be managed by the control on the transmission itself with very different connection ratios from one another and, with the actuation of their clutch FD or FS in the required moment, intervene in the management of the torque to the drive axle(s) of the vehicle in electric propulsion or braking, i.e., obtaining it with energy recovery.

Obviously, those skilled in the art, in order to satisfy specific and contingent requirements, may make numerous modifications to a compact powertrain, described above, all nevertheless falling within the scope of protection of the present invention as defined by the following claims. Thus, although less conveniently the engines depicted can be replaced by endothermic engines with single crankcase for each engine or with different arrangement of the multiple cylinders in a single row or in rows with arrangement other than the most advantageous narrow or wide "V" conformation. Furthermore, the engaged insertion of the gears described on the respective internal transmission shaft, left or right, or even on the output shaft can be obtained with coupling engagements which are different from the front engagements depicted. Moreover, the pair of idle gears can be obtained with a transmission ratio towards the two transmission shafts, right and left, which is different so as to further intersperse the transmission ratios between the two right and left shafts. Finally, making one or both of the front disconnection engagements 15d, 15s between an input shaft, right ED or left ES, and the respective internal transmission shaft, right TD or left TS, can be adopted according to the application needs of the compact powertrain.

The invention claimed is:

1. Compact powertrain, comprising a first engine and a second engine and means for rotationally connecting said engines to a common output shaft; the engines have drive shafts with axles parallel to each other; connection means between said drive shafts and an output shaft, moreover, they comprise first coupling means on said first drive shaft for connecting said first drive shaft to the output shaft, and second coupling means for connecting said second drive shaft to said output shaft; the delivery of the rotational torque and power is controlled by the adjustment of each engine and said coupling means, being adapted to selectively connect/disconnect said drive shafts from said output shaft; the means for connecting the rotation of the two engines, left and right, to the output shaft comprise a clutch assembly and a gearbox; the clutch assembly is provided with a single clutch for the drive shaft which connects or disconnects the respective drive shaft with a corresponding input and transmission shaft inside the gearbox; the common output shaft, of the rotation from the compact powertrain, rotates receiving motion by means of pairs of gears present respectively on one said transmission shaft, inside the gearbox, and on the output shaft, with the selective insertion or disengagement of the clutches and, depending on the rotational speed, of coupling engagements on the transmission shafts and of said gears present on said shafts; characterized in that it has one or more idle gears on the output shaft controlled by the rotation with at least one coupling engagement to the output shaft to receive the rotation, with the engagement inserted, or, when disengaged, transmit the rotation from one transmission shaft towards the other transmission shaft without any action on the output shaft.

2. Compact powertrain according to claim 1, wherein the first engine or the second engine is multi-cylindrical; a rotation reversal shaft is present between one of the transmission shafts, for rotation reversal, and the common output shaft or on the rotation output shaft for the specific obtained conformation of the compact powertrain for land vehicles or boats.

3. High performance boat, provided with at least one compact powertrain, made according to claim 2, wherein upon rotation the reverse shaft engages between the output shaft from the gearbox and a shaft connecting to the axis line with the propeller of the compact powertrain.

4. High performance boat, according to claim 3, wherein two compact powertrains are installed and wherein the variation of the transmission ratio occurs without stopping the rotation of the propeller connected to the axis line.

5. High performance boat according to claim 3, wherein two compact powertrains are installed and wherein the drive shaft of at least one of the engines is connected to the corresponding internal transmission shaft by means of a front disconnection engagement.

6. Compact powertrain, according to claim 1, wherein both engines are multi-cylindrical and made on a single engine crankcase with the division of the cylinders into two rows of cylinders (9) and with a "V"-shaped arrangement.

7. Compact powertrain according to claim 1, wherein one of the two endothermic engines is replaced by an electric engine which also acts as a slowing or braking generator.

8. Motor vehicle, made according to claim 7, provided with a compact powertrain, wherein the transmission ratios between the keyed gears, on a respective internal transmission shaft, have a different value and are scaled in alternating succession with each other if geared by the left internal transmission shaft or the right internal transmission shaft, towards the output shaft of the rotary motion from the gearbox.

9. Compact powertrain, according to claim 7, wherein there are two coupling engagements on the output shaft; a pair of gears is free to rotate on the output shaft, obtaining an internal transmission between the transmission shafts, right and left, with identical transmission ratio and has a third coupling engagement commanded if necessary of the pair of gears with the output shaft.

10. Compact powertrain according to claim 9, wherein at least one disconnection engagement is present between an input shaft, right or left, and the respective internal transmission shaft, right or left.

11. Compact powertrain according to claim 1, wherein there are two coupling engagements on the output shaft; a pair of gears is free to rotate on the output shaft, obtaining an internal transmission between the transmission shafts, right and left, with identical transmission ratio and has a third coupling engagement commanded if necessary of the pair of gears with the output shaft.

12. Compact powertrain, according to claim 11, wherein the arrangement of the drive shafts of the two engines, first and second, identifies a plane, together with the clutches of the clutch assembly and the transmission shafts inside the gearbox i.e., of the axles of the left and right assemblies, not containing the axle of the output shaft, which remains parallel thereto but not coplanar.

13. Compact powertrain according to claim 12, wherein said transmission shafts inside the gearbox, left and right, have a respective wheelbase with the output shaft of the rotary motion from the gearbox of a different value.

14. Compact powertrain according to claim 1, wherein at least one disconnection engagement is present between an input shaft, right or left, and the respective internal transmission shaft, right or left.

15. Compact powertrain, according to claim 1, wherein the arrangement of the drive shafts of the two engines, first and second, identifies a plane, together with the clutches of the clutch assembly and the transmission shafts (TS, TD) inside the gearbox i.e., of the axles of the left and right assemblies, not containing the axle of the output shaft, which remains parallel thereto but not coplanar.

16. Compact powertrain according to claim 15, wherein in the gearbox at least one pair of gears between each of the two internal transmission shafts, left and right, and the output shaft both engage on a single gear placed on the output shaft, regardless of whether they have the same or different transmission ratio thereof.

17. Compact powertrain, according to claim 1, wherein said transmission shafts inside the gearbox, left and right, have a respective wheelbase with the output shaft of the rotary motion from the gearbox of a different value.

18. Motor vehicle, provided with a compact powertrain made according to claim 1, wherein the transmission ratios between the keyed gears, on a respective internal transmission shaft, have a different value and are scaled in alternating succession with each other if geared by the left internal transmission shaft or the right internal transmission shaft, towards the output shaft of the rotary motion from the gearbox.

19. Motor vehicle, made according to claim 18, provided with a compact powertrain wherein pairs of gears are present and gearing between the internal transmission shafts to the gearbox and the output shaft and wherein the pair of gears of the highest gear, of each transmission shaft, has a rotation ratio of equal value from each internal transmission shaft towards the output shaft, to obtain the transmission ratio with the highest gear.

20. Motor vehicle, made according to claim 18, providedwith a compact powertrain wherein the transmission of the rotational motion to the wheels also occurs by means of the transmission to the other drive wheels, of a four-wheel drive vehicle, with a transmission shaft at the second axle which engages with the output shaft from the gearbox.

* * * * *